(12) United States Patent
Shand

(10) Patent No.: US 12,222,452 B2
(45) Date of Patent: Feb. 11, 2025

(54) SYSTEMS AND METHODS FOR ADAPTIVE RANGE COVERAGE USING LIDAR

(71) Applicant: Waymo LLC, Mountain View, CA (US)

(72) Inventor: Mark Alexander Shand, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/500,659

(22) Filed: Nov. 2, 2023

(65) Prior Publication Data
US 2024/0061089 A1 Feb. 22, 2024

Related U.S. Application Data

(63) Continuation of application No. 17/659,674, filed on Apr. 19, 2022, now Pat. No. 11,841,464, which is a
(Continued)

(51) Int. Cl.
*G01S 7/48* (2006.01)
*G01S 1/10* (2006.01)
(Continued)

(52) U.S. Cl.
CPC .............. *G01S 7/484* (2013.01); *G01S 1/10* (2013.01); *G01S 7/4813* (2013.01);
(Continued)

(58) Field of Classification Search
None
See application file for complete search history.

(56) References Cited

U.S. PATENT DOCUMENTS

| 6,057,909 A | 5/2000 | Yahav et al. |
| 7,733,464 B2 | 6/2010 | David et al. |

(Continued)

FOREIGN PATENT DOCUMENTS

| CN | 1502047 A | 6/2004 |
| CN | 102713667 A | 10/2012 |

(Continued)

OTHER PUBLICATIONS

International Searching Authority, International Search Report and Written Opinion mailed on Mar. 4, 2019, issued in connection with International Patent Application No. PCT/US2018/058452, filed on Oct. 31, 2018, 12 pages.

(Continued)

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to systems and methods that facilitate light detection and ranging operations. An example method includes determining, for at least one light-emitter device of a plurality of light-emitter devices, a light pulse schedule. The plurality of light-emitter devices is operable to emit light along a plurality of emission vectors. The light pulse schedule is based on a respective emission vector of the at least one light-emitter device and a three-dimensional map of an external environment. The light pulse schedule includes at least one light pulse parameter and a listening window duration. The method also includes causing the at least one light-emitter device of the plurality of light-emitter devices to emit a light pulse according to the light pulse schedule. The light pulse interacts with an external environment.

20 Claims, 12 Drawing Sheets

602 — Determining, for at least one light-emitter device of a plurality of light-emitter devices, a light pulse schedule, wherein the plurality of light-emitter devices is operable to emit light along a plurality of emission vectors, wherein the light pulse schedule is based on a respective emission vector of the at least one light-emitter device and a three-dimensional map of an external environment, wherein the light pulse schedule comprises at least one light pulse parameter and a listening window duration 604 — Causing the at least one light-emitter device of the plurality of light-emitter devices to emit a light pulse according to the light pulse schedule, wherein the light pulse interacts with an external environment

Related U.S. Application Data continuation of application No. 15/852,788, filed on Dec. 22, 2017, now Pat. No. 11,340,339.

(51) Int. Cl.

| | | |
|---|---|---|
| G01S 7/481 | (2006.01) | |
| G01S 7/484 | (2006.01) | |
| G01S 7/4861 | (2020.01) | |
| G01S 17/10 | (2020.01) | |
| G01S 17/89 | (2020.01) | |
| G01S 17/931 | (2020.01) | |

(52) U.S. Cl.
CPC .......... *G01S 7/4815* (2013.01); *G01S 7/4861* (2013.01); *G01S 17/10* (2013.01); *G01S 17/89* (2013.01); *G01S 17/931* (2020.01)

(56) References Cited

U.S. PATENT DOCUMENTS

| | | |
|---|---|---|
| 8,436,763 B2 | 5/2013 | Wintermantel |
| 9,103,669 B2 | 8/2015 | Giacotto et al. |
| 9,383,753 B1 | 7/2016 | Templeton et al. |
| 2008/0266171 A1 | 10/2008 | Weber et al. |
| 2010/0135007 A1 | 6/2010 | Seabrook |
| 2013/0088872 A1 | 4/2013 | Ball |
| 2013/0201288 A1 | 8/2013 | Billerbeck et al. |
| 2015/0226853 A1 | 8/2015 | Seo et al. |
| 2016/0245919 A1 | 8/2016 | Kalscheur |
| 2016/0274589 A1 | 9/2016 | Templeton et al. |
| 2017/0003392 A1 | 1/2017 | Bartlett et al. |
| 2017/0219695 A1 | 8/2017 | Hall et al. |
| 2018/0284278 A1 | 10/2018 | Russell et al. |

FOREIGN PATENT DOCUMENTS

| | | |
|---|---|---|
| CN | 105556338 A | 5/2016 |
| EP | 3217190 A1 | 9/2017 |
| JP | 05-057688 U | 7/1993 |
| JP | 07-191146 A | 7/1995 |
| JP | 07-209421 A | 8/1995 |
| JP | 07-260937 A | 10/1995 |
| JP | 2014-145697 A | 8/2014 |
| JP | 2016-017785 A | 2/2016 |
| JP | 2016-534346 T | 11/2016 |
| KR | 10-2017-0132884 A | 12/2017 |
| WO | 2014/032831 A1 | 3/2014 |
| WO | 2017/110417 A1 | 6/2017 |
| WO | 2017/132703 A1 | 8/2017 |
| WO | 2017/192566 A1 | 11/2017 |

OTHER PUBLICATIONS

European Patent Office, Extended European Search Report mailed on Jul. 8, 2021, issued in connection with European Patent Application No. 18892337.9, 12 pages.

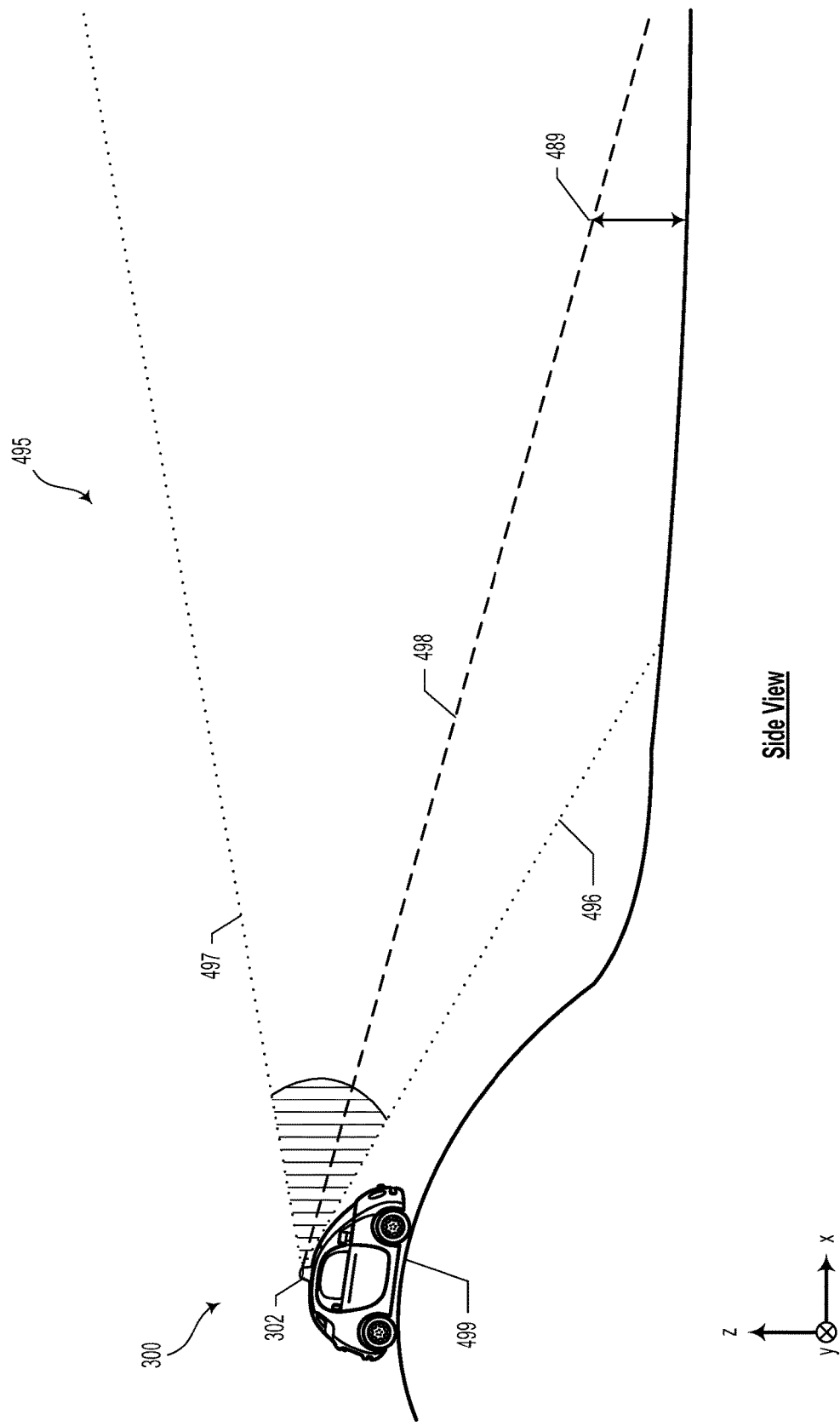

Side View

SYSTEMS AND METHODS FOR ADAPTIVE RANGE COVERAGE USING LIDAR

CROSS-REFERENCE TO RELATED APPLICATIONS

The present application is a continuation of U.S. patent application Ser. No. 17/659,674, filed Apr. 19, 2022, which is a continuation of U.S. patent application Ser. No. 15/852,788, filed Dec. 22, 2017 and issued as U.S. Pat. No. 11,340,339 on May 24, 2022, the contents of which are hereby incorporated by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with some, little, or no input from a driver. Such autonomous or semi-autonomous vehicles can include one or more sensors that are configured to detect information about the environment in which the vehicle operates.

One such sensor is a light detection and ranging (LIDAR) device. A LIDAR can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

The present disclosure generally relates to light detection and ranging (LIDAR) systems, which may be configured to obtain information about an environment. Such LIDAR devices may be implemented in vehicles, such as autonomous and semi-autonomous automobiles, trucks, motorcycles, and other types of vehicles that can move within their respective environments.

In a first aspect, a system is provided. The system includes a plurality of light-emitter devices. The plurality of light-emitter devices is operable to emit light along a plurality of emission vectors such that the emitted light interacts with an external environment of the system. The system also includes a receiver subsystem configured to provide information indicative of interactions between the emitted light and the external environment. The system additionally includes a controller operable to carry out operations. The operations include determining, for at least one light-emitter device of the plurality of light-emitter devices, a light pulse schedule. The light pulse schedule is based on a respective emission vector of the at least one light-emitter device and a three-dimensional map of the external environment. The light pulse schedule includes at least one light pulse parameter and a listening window duration. The system also includes causing the at least one light-emitter device of the plurality of light-emitter devices to emit a light pulse according to the light pulse schedule.

In a second aspect, a method is provided. The method includes determining, for at least one light-emitter device of a plurality of light-emitter devices, a light pulse schedule. The plurality of light-emitter devices is operable to emit light along a plurality of emission vectors. The light pulse schedule is based on a respective emission vector of the at least one light-emitter device and a three-dimensional map of an external environment. The light pulse schedule includes at least one light pulse parameter and a listening window duration. The method also includes causing the at least one light-emitter device of the plurality of light-emitter devices to emit a light pulse according to the light pulse schedule. The light pulse interacts with an external environment.

In a third aspect, a system is provided. The system includes a plurality of light-emitter devices. The plurality of light-emitter devices is operable to emit light along a plurality of emission vectors such that the emitted light interacts with an external environment of the system. The system also includes a receiver subsystem configured to provide information indicative of interactions between the emitted light and the external environment. The system further includes a controller operable to carry out operations. The operations include determining, for at least one light-emitter device of the plurality of light-emitter devices, a light pulse schedule. The light pulse schedule is based on a respective emission vector of the at least one light-emitter device and a three-dimensional map of the external environment. The determined light pulse schedule includes at least one light pulse parameter and a listening window duration. The operations also include causing the at least one light-emitter device of the plurality of light-emitter devices to emit a first light pulse according to the determined light pulse schedule and a second light pulse according to a default light pulse schedule.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 4F illustrates a sensing scenario, according to an example embodiment.

DETAILED DESCRIPTION

Figure 1A:
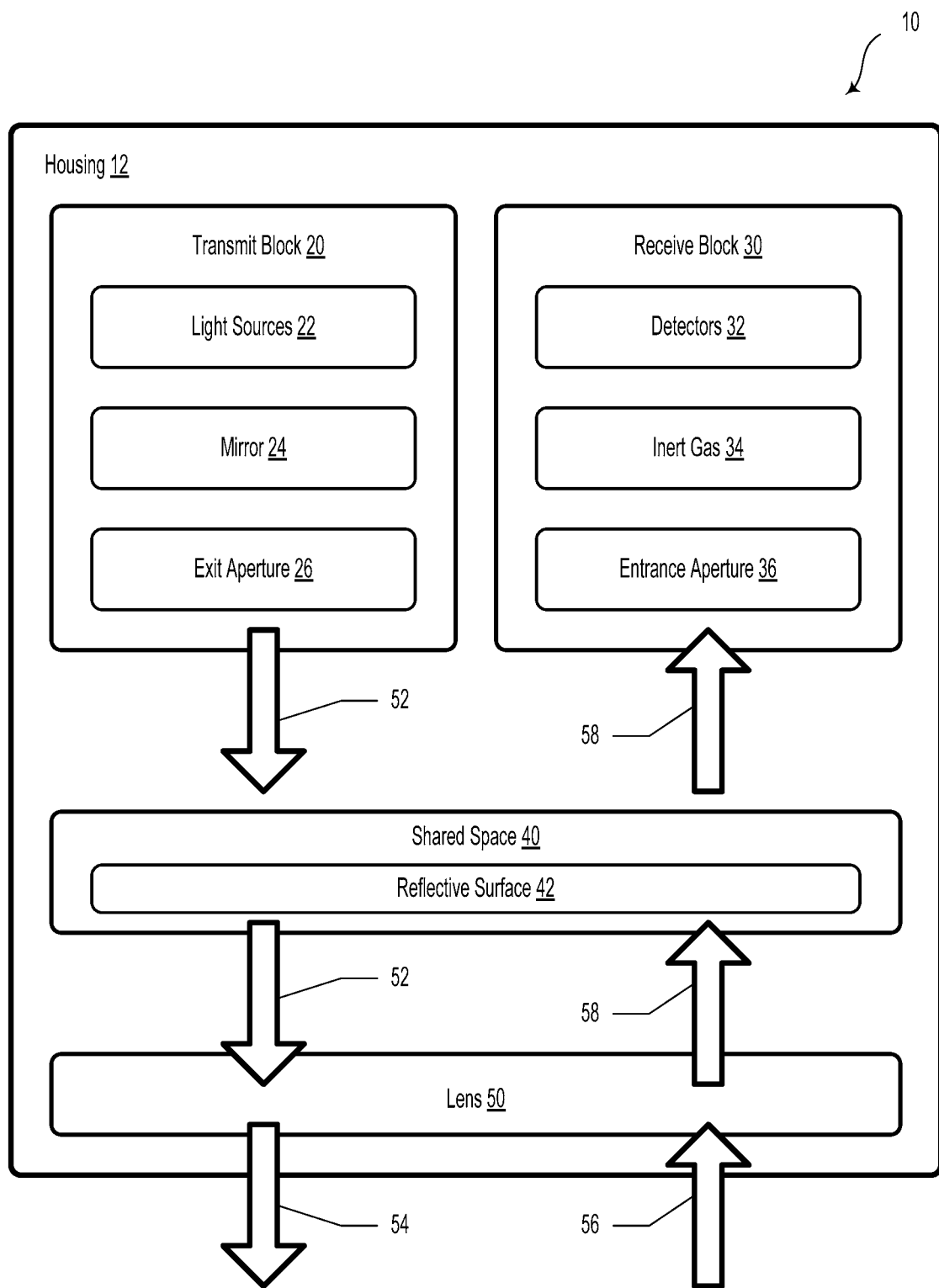
FIG. 1A illustrates a sensing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A LIDAR system may include a transmit assembly that includes a plurality of light emitters. In some embodiments, the plurality of light emitters may be arranged along a substrate having a principal plane. Furthermore, each light emitter may be arranged as having a different emission angle such that the plurality of light emitters may be configured to emit light at various emission angles (e.g., within an angular range between +2 degrees above the horizon and −18 degrees below the horizon assuming a 2 meter LIDAR height and a flat earth and vehicle pose condition) along the principal plane. The LIDAR system may be configured to rotate about a yaw axis such that the transmit assembly and the plurality of light emitters illuminate the environment. In some embodiments, the LIDAR system may rotate at 10 Hz or 20 Hz. Other rotational rates are possible and contemplated herein. In some embodiments, the LIDAR system may provide point cloud information for an autonomous or semi-autonomous vehicle (e.g., a self-driving car, truck, boat, or aerial vehicle).

In some embodiments, the respective light emitters of the plurality of light emitters may emit light pulses in sequential order (e.g., starting by firing a light emitter with a highest emission angle and ending by firing a light emitter with a lowest emission angle or vice versa). After firing each light pulse, there may be a pause (e.g., a "listening" period) during which time the light pulse may travel from the light emitter, interact with an object in the environment (e.g., scatter or reflect), and a portion of the light pulse may return to the LIDAR device and be received by photodetectors of a receive assembly. In some cases, the listening period or listening window for a light pulse to travel 150 meters and back (a total distance of 300 meters) may be approximately 1 microsecond.

To improve resolution in the yaw angle, the listening window may be reduced for light pulses that are emitted by downward-pointing light emitters. That is, if a light pulse from a downward-pointing light emitter is likely to interact with a ground surface within, for example, 20 meters, the listening window may be reduced to approximately 130 nanoseconds, based on a round trip time of the emitted light pulse. In other embodiments, the range of listening windows may be adjustable between 100 nanoseconds and 2 microseconds; however, other listening windows are possible. The listening window corresponding to each light pulse may be adjusted based on the likely range to the ground surface in the environment. Accordingly, the overall time to fire each of the plurality of light emitters is reduced and the LIDAR device may be able to start a new vertical scan while rotating over a smaller yaw angle. In other words, by reducing the overall cycle time, at least some light emitters may be configured to fire more frequently and, in some embodiments, finer yaw resolution may be provided by the LIDAR system.

Systems and methods described herein include dynamic adjustment of the listening windows based on the emission angle of each light pulse and a maximum predicted distance for each yaw angle. That is, as the LIDAR device spins about the yaw axis, listening windows may be adjusted based on how far the light pulses are anticipated to travel before they interact with the environment (e.g., the ground). The maximum predicted distance may be based on the pose of the LIDAR system and/or the vehicle associated with the LIDAR system (e.g., the pose of the vehicle) and/or may be based on elevation data, which may be obtained by mapping data or sampling data. In an example embodiment, the sampling data may include obtaining the elevation data by performing a 360-degree scan of the LIDAR system while pulsing the emitter devices with a predefined listening window (e.g., 2 microseconds). In such a scenario, the LIDAR system may obtain information that includes the distance to the ground as a function of yaw angle. The LIDAR system may then use the information to adjust listening windows in subsequent scans.

In some embodiments, a 360-degree scan of the LIDAR system may include a mixture of long listening windows with normal/reduced time listening windows on a fine time scale. That is, the LIDAR system may be configured to interleave, alternate, or otherwise intermingle long listening times with shortened listening windows. Other ways to vary listening windows associated with emitted light pulses from a LIDAR, specifically taking into account predicted distances to objects in the environment, are contemplated herein.

Additionally or alternatively, the power of each light pulse may be adjusted based on the maximum predicted distance for each combination of yaw angle and beam elevation within a given field of view of the LIDAR. For example, if the sampling data indicate a maximum predicted distance for a given light pulse is 10 meters, the amount of power provided for the light pulse may be decreased by 80% or more compared to light pulses predicted to travel 200 meters. That is, the power of a given light pulse may relate to a maximum reliable detection range. In an effort to reduce power usage by the LIDAR system while reliably detecting objects in the environment, the light pulse power may be adjusted based on the maximum predicted distance that the light pulse may travel. As such, the LIDAR system may more efficiently transmit light pulses into its environment and reduce issues associated with retro-reflection and blooming, which may be caused by receiving too many photons from close-range targets/objects.

II. Example Systems

FIG. 1A illustrates a sensing system 10, according to an example embodiment. The sensing system 10 may be a light detection and ranging (LIDAR) system. The sensing system includes a housing 12 that houses an arrangement of various components, such as a transmit block 20, a receive block 30, a shared space 40, and a lens 50. The sensing system 10 includes an arrangement of components configured to provide emitted light beams 52 from the transmit block 20 that are collimated by the lens 50 and transmitted into an environment of the sensing system 10 as collimated light beams 54. Furthermore, the sensing system 10 includes an arrangement of components configured to collect reflected light 56 from one or more objects in the environment of the sensing system 10 by the lens 50 for focusing towards the receive block 30 as focused light 58. The reflected light 56 includes light from the collimated light beams 54 that was reflected by the one or more objects in the environment of the sensing system 10.

The emitted light beams 52 and focused light 58 may traverse the shared space 40 also included in the housing 10. In some embodiments, the emitted light beams 52 propagate along a transmit path through the shared space 40 and the focused light 58 propagates along a receive path through the shared space 40.

The sensing system 10 can determine an aspect of the one or more objects (e.g., location, shape, etc.) in the environment of the sensing system 10 by processing the focused light 58 received by the receive block 30. For example, the sensing system 10 can compare a time when pulses included in the emitted light beams 52 were emitted by the transmit block 20 with a time when corresponding pulses included in the focused light 58 were received by the receive block 30 and determine the distance between the one or more objects and the sensing system 10 based on the comparison.

The housing 12 included in the sensing system 10 can provide a platform for mounting the various components included in the sensing system 10. The housing 12 can be formed from any material capable of supporting the various components of the sensing system 10 included in an interior space of the housing 12. For example, the housing 12 may be formed from a structural material such as plastic or metal.

In some examples, the housing 12 may include optical shielding configured to reduce ambient light and/or unintentional transmission of the emitted light beams 52 from the transmit block 20 to the receive block 30. The optical shielding can be provided by forming and/or coating the outer surface of the housing 12 with a material that blocks the ambient light from the environment. Additionally, inner surfaces of the housing 12 can include and/or be coated with the material described above to optically isolate the transmit block 20 from the receive block 30 to prevent the receive block 30 from receiving the emitted light beams 52 before the emitted light beams 52 reach the lens 50.

In some examples, the housing 12 can be configured for electromagnetic shielding to reduce electromagnetic noise (e.g., Radio Frequency (RF) Noise, etc.) from ambient environment of the sensor system 10 and/or electromagnetic noise between the transmit block 20 and the receive block 30. Electromagnetic shielding can improve quality of the emitted light beams 52 emitted by the transmit block 20 and reduce noise in signals received and/or provided by the receive block 30. Electromagnetic shielding can be achieved by forming and/or coating the housing 12 with one or more materials such as a metal, metallic ink, metallic foam, carbon foam, or any other material configured to appropriately absorb or reflect electromagnetic radiation. Metals that can be used for the electromagnetic shielding can include for example, copper or nickel.

In some examples, the housing 12 can be configured to have a substantially cylindrical shape and to rotate about an axis of the sensing system 10. For example, the housing 12 can have the substantially cylindrical shape with a diameter of approximately 10 centimeters. In some examples, the axis is substantially vertical. By rotating the housing 12 that includes the various components, in some examples, a three-dimensional map of a 360 degree view of the environment of the sensing system 10 can be determined without frequent recalibration of the arrangement of the various components of the sensing system 10. Additionally or alternatively, the sensing system 10 can be configured to tilt the axis of rotation of the housing 12 to control the field of view of the sensing system 10.

Although not illustrated in FIG. 1A, the sensing system 10 can optionally include a mounting structure for the housing 12. The mounting structure can include a motor or other means for rotating the housing 12 about the axis of the sensing system 10. Alternatively, the mounting structure can be included in a device and/or system other than the sensing system 10.

In some examples, the various components of the sensing system 10 such as the transmit block 20, receive block 30, and the lens 50 can be removably mounted to the housing 12 in predetermined positions to reduce burden of calibrating the arrangement of each component and/or subcomponents included in each component. Thus, the housing 12 acts as the platform for the various components of the sensing system 10 to provide ease of assembly, maintenance, calibration, and manufacture of the sensing system 10.

The transmit block 20 includes a plurality of light sources 22 that can be configured to emit the plurality of emitted light beams 52 via an exit aperture 26. In some examples, each of the plurality of emitted light beams 52 corresponds to one of the plurality of light sources 22. The transmit block 20 can optionally include a mirror 24 along the transmit path of the emitted light beams 52 between the light sources 22 and the exit aperture 26.

The light sources 22 can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 52. In some examples, the light sources 22 can be configured to emit the emitted light beams 52 in a wavelength range that can be detected by detectors 32 included in the receive block 30. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 22 can be configured to emit the emitted light beams 52 in the form of pulses. In some examples, the plurality of light sources 22 can be disposed on one or more substrates (e.g., printed circuit boards (PCB), flexible PCBs, etc.) and arranged to emit the plurality of light beams 52 towards the exit aperture 26.

In some examples, the plurality of light sources 22 can be configured to emit uncollimated light beams included in the emitted light beams 52. For example, the emitted light beams 52 can diverge in one or more directions along the transmit path due to the uncollimated light beams emitted by the plurality of light sources 22. In some examples, vertical and horizontal extents of the emitted light beams 52 at any position along the transmit path can be based on an extent of the divergence of the uncollimated light beams emitted by the plurality of light sources 22.

The exit aperture 26 arranged along the transmit path of the emitted light beams 52 can be configured to accommodate the vertical and horizontal extents of the plurality of light beams 52 emitted by the plurality of light sources 22 at the exit aperture 26. It is noted that the block diagram shown in FIG. 1A is described in connection with functional modules for convenience in description. However, the functional modules in the block diagram of FIG. 1A can be physically implemented in other locations. For example, although illustrated that the exit aperture 26 is included in the transmit block 20, the exit aperture 26 can be physically included in both the transmit block 20 and the shared space 40. For example, the transmit block 20 and the shared space 40 can be separated by a wall that includes the exit aperture 26. In this case, the exit aperture 26 can correspond to a transparent portion of the wall. In one example, the transparent portion can be a hole or cut-away portion of the wall. In another example, the wall can be formed from a transparent substrate (e.g., glass) coated with a non-transparent material, and the exit aperture 26 can be a portion of the substrate that is not coated with the non-transparent material.

In some examples of the sensing system 10, it may be desirable to minimize size of the exit aperture 26 while accommodating the vertical and horizontal extents of the plurality of light beams 52. For example, minimizing the size of the exit aperture 26 can improve the optical shielding of the light sources 22 described above in the functions of the housing 12. Additionally or alternatively, the wall separating the transmit block 20 and the shared space 40 can be arranged along the receive path of the focused light 58, and thus, the exit aperture 26 can be minimized to allow a larger portion of the focused light 58 to reach the wall. For example, the wall can be coated with a reflective material (e.g., reflective surface 42 in shared space 40) and the receive path can include reflecting the focused light 58 by the reflective material towards the receive block 30. In this case, minimizing the size of the exit aperture 26 can allow a larger portion of the focused light 58 to reflect off the reflective material with which the wall is coated.

To minimize the size of the exit aperture 26, in some examples, the divergence of the emitted light beams 52 can be reduced by partially collimating the uncollimated light beams emitted by the light sources 22 to minimize the vertical and horizontal extents of the emitted light beams 52 and thus minimize the size of the exit aperture 26. For example, each light source of the plurality of light sources 22 can include a cylindrical lens arranged adjacent to the light source. The light source may emit a corresponding uncollimated light beam that diverges more in a first direction than in a second direction. The cylindrical lens may pre-collimate the uncollimated light beam in the first direction to provide a partially collimated light beam, thereby reducing the divergence in the first direction. In some examples, the partially collimated light beam diverges less in the first direction than in the second direction. Similarly, uncollimated light beams from other light sources of the plurality of light sources 22 can have a reduced beam width in the first direction and thus the emitted light beams 52 can have a smaller divergence due to the partially collimated light beams. In this example, at least one of the vertical and horizontal extents of the exit aperture 26 can be reduced due to partially collimating the light beams 52.

Additionally or alternatively, to minimize the size of the exit aperture 26, in some examples, the light sources 22 can be arranged along a shaped surface defined by the transmit block 20. In some examples, the shaped surface may be faceted and/or substantially curved. The faceted and/or curved surface can be configured such that the emitted light beams 52 converge towards the exit aperture 26, and thus the vertical and horizontal extents of the emitted light beams 52 at the exit aperture 26 can be reduced due to the arrangement of the light sources 22 along the faceted and/or curved surface of the transmit block 20.

In some examples, a curved surface of the transmit block 20 can include a curvature along the first direction of divergence of the emitted light beams 52 and a curvature along the second direction of divergence of the emitted light beams 52, such that the plurality of light beams 52 converge towards a central area in front of the plurality of light sources 22 along the transmit path.

To facilitate such curved arrangement of the light sources 22, in some examples, the light sources 22 can be disposed on a flexible substrate (e.g., flexible PCB) having a curvature along one or more directions. For example, the curved flexible substrate can be curved along the first direction of divergence of the emitted light beams 52 and the second direction of divergence of the emitted light beams 52. Additionally or alternatively, to facilitate such curved arrangement of the light sources 22, in some examples, the light sources 22 can be disposed on a curved edge of one or more vertically-oriented printed circuit boards (PCBs), such that the curved edge of the PCB substantially matches the curvature of the first direction (e.g., the vertical plane of the PCB). In this example, the one or more PCBs can be mounted in the transmit block 20 along a horizontal curvature that substantially matches the curvature of the second direction (e.g., the horizontal plane of the one or more PCBs). For example, the transmit block 20 can include four PCBs, with each PCB mounting sixteen light sources, so as to provide 64 light sources along the curved surface of the transmit block 20. In this example, the 64 light sources are arranged in a pattern such that the emitted light beams 52 converge towards the exit aperture 26 of the transmit block 20.

The transmit block 20 can optionally include the mirror 24 along the transmit path of the emitted light beams 52 between the light sources 22 and the exit aperture 26. By including the mirror 24 in the transmit block 20, the transmit path of the emitted light beams 52 can be folded to provide a smaller size of the transmit block 20 and the housing 12 of the sensing system 10 than a size of another transmit block where the transmit path that is not folded.

The receive block 30 includes a plurality of detectors 32 that can be configured to receive the focused light 58 via an entrance aperture 36. In some examples, each of the plurality of detectors 32 is configured and arranged to receive a portion of the focused light 58 corresponding to a light beam emitted by a corresponding light source of the plurality of light sources 22 and reflected of the one or more objects in the environment of the sensing system 10. The receive block 30 can optionally include the detectors 32 in a sealed environment having an inert gas 34.

The detectors 32 may comprise photodiodes, avalanche photodiodes, single-photon avalanche diodes (SPADs), phototransistors, silicon photomultipliers (SiPMs), cameras, active pixel sensors (APS), charge coupled devices (CCD), cryogenic detectors, or any other sensor of light configured to receive focused light 58 having wavelengths in the wavelength range of the emitted light beams 52.

To facilitate receiving, by each of the detectors 32, the portion of the focused light 58 from the corresponding light source of the plurality of light sources 22, the detectors 32 can be disposed on one or more substrates and arranged accordingly. For example, the light sources 22 can be arranged along a curved surface of the transmit block 20. Detectors 32 can be arranged along a curved surface of the receive block 30. In some embodiments, the curved surface of the receive block 30 may include a similar or identical curved surface as that of transmit block 20. Thus, each of the detectors 32 may be configured to receive light that was originally emitted by a corresponding light source of the plurality of light sources 22.

To provide the curved surface of the receive block 30, the detectors 32 can be disposed on the one or more substrates similarly to the light sources 22 disposed in the transmit block 20. For example, the detectors 32 can be disposed on a flexible substrate (e.g., flexible PCB) and arranged along the curved surface of the flexible substrate to each receive focused light originating from a corresponding light source of the light sources 22. In this example, the flexible substrate may be held between two clamping pieces that have surfaces corresponding to the shape of the curved surface of the receive block 30. Thus, in this example, assembly of the receive block 30 can be simplified by sliding the flexible substrate onto the receive block 30 and using the two clamping pieces to hold it at the correct curvature.

The focused light 58 traversing along the receive path can be received by the detectors 32 via the entrance aperture 36. In some examples, the entrance aperture 36 can include a filtering window that passes light having wavelengths within the wavelength range emitted by the plurality of light sources 22 and attenuates light having other wavelengths. In this example, the detectors 32 receive the focused light 58 substantially comprising light having the wavelengths within the wavelength range.

In some examples, the plurality of detectors 32 included in the receive block 30 can include, for example, avalanche photodiodes in a sealed environment that is filled with the inert gas 34. The inert gas 34 may comprise, for example, nitrogen.

The shared space 40 includes the transmit path for the emitted light beams 52 from the transmit block 20 to the lens 50, and includes the receive path for the focused light 58 from the lens 50 to the receive block 30. In some examples, the transmit path at least partially overlaps with the receive path in the shared space 40. By including the transmit path and the receive path in the shared space 40, advantages with respect to size, cost, and/or complexity of assembly, manufacture, and/or maintenance of the sensing system 10 can be provided.

While the exit aperture 26 and the entrance aperture 36 are illustrated as being part of the transmit block 20 and the receive block 30, respectively, it is understood that such apertures may be arranged or placed at other locations. In some embodiments, the function and structure of the exit aperture 26 and the entrance aperture 36 may be combined. For example, the shared space 40 may include a shared entrance/exit aperture. It will be understood that other ways to arrange the optical components of system 10 within housing 12 are possible and contemplated.

In some examples, the shared space 40 can include a reflective surface 42. The reflective surface 42 can be arranged along the receive path and configured to reflect the focused light 58 towards the entrance aperture 36 and onto the detectors 32. The reflective surface 42 may comprise a prism, mirror or any other optical element configured to reflect the focused light 58 towards the entrance aperture 36 in the receive block 30. In some examples, a wall may separate the shared space 40 from the transmit block 20. In these examples, the wall may comprise a transparent substrate (e.g., glass) and the reflective surface 42 may comprise a reflective coating on the wall with an uncoated portion for the exit aperture 26.

In embodiments including the reflective surface 42, the reflective surface 42 can reduce size of the shared space 40 by folding the receive path similarly to the mirror 24 in the transmit block 20. Additionally or alternatively, in some examples, the reflective surface 42 can direct the focused light 58 to the receive block 30 further providing flexibility to the placement of the receive block 30 in the housing 12. For example, varying the tilt of the reflective surface 42 can cause the focused light 58 to be reflected to various portions of the interior space of the housing 12, and thus the receive block 30 can be placed in a corresponding position in the housing 12. Additionally or alternatively, in this example, the sensing system 10 can be calibrated by varying the tilt of the reflective surface 42.

The lens 50 mounted to the housing 12 can have an optical power to both collimate the emitted light beams 52 from the light sources 22 in the transmit block 20, and focus the reflected light 56 from the one or more objects in the environment of the sensing system 10 onto the detectors 32 in the receive block 30. In one example, the lens 50 has a focal length of approximately 120 mm. By using the same lens 50 to perform both of these functions, instead of a transmit lens for collimating and a receive lens for focusing, advantages with respect to size, cost, and/or complexity can be provided. In some examples, collimating the emitted light beams 52 to provide the collimated light beams 54 allows determining the distance travelled by the collimated light beams 54 to the one or more objects in the environment of the sensing system 10.

While, as described herein, lens 50 is utilized as a transmit lens and a receive lens, it will be understood that separate lens and/or other optical elements are contemplated within the scope of the present disclosure. For example, lens 50 could represent distinct lenses or lens sets along discrete optical transmit and receive paths.

In an example scenario, the emitted light beams 52 from the light sources 22 traversing along the transmit path can be collimated by the lens 50 to provide the collimated light beams 54 to the environment of the sensing system 10. The collimated light beams 54 may then reflect off the one or more objects in the environment of the sensing system 10 and return to the lens 50 as the reflected light 56. The lens 50 may then collect and focus the reflected light 56 as the focused light 58 onto the detectors 32 included in the receive block 30. In some examples, aspects of the one or more objects in the environment of the sensing system 10 can be determined by comparing the emitted light beams 52 with the focused light beams 58. The aspects can include, for example, distance, shape, color, and/or material of the one or more objects. Additionally, in some examples, by rotating the housing 12, a three-dimensional map of the surroundings of the sensing system 10 can be determined.

In some examples where the plurality of light sources 22 are arranged along a curved surface of the transmit block 20, the lens 50 can be configured to have a focal surface corresponding to the curved surface of the transmit block 20. For example, the lens 50 can include an aspheric surface outside the housing 12 and a toroidal surface inside the housing 12 facing the shared space 40. In this example, the shape of the lens 50 allows the lens 50 to both collimate the emitted light beams 52 and focus the reflected light 56. Additionally, in this example, the shape of the lens 50 allows the lens 50 to have the focal surface corresponding to the curved surface of the transmit block 20. In some examples, the focal surface provided by the lens 50 substantially matches the curved shape of the transmit block 20. Additionally, in some examples, the detectors 32 can be arranged similarly in the curved shape of the receive block 30 to receive the focused light 58 along the curved focal surface provided by the lens 50. Thus, in some examples, the curved surface of the receive block 30 may also substantially match the curved focal surface provided by the lens 50.

Figure 1B:
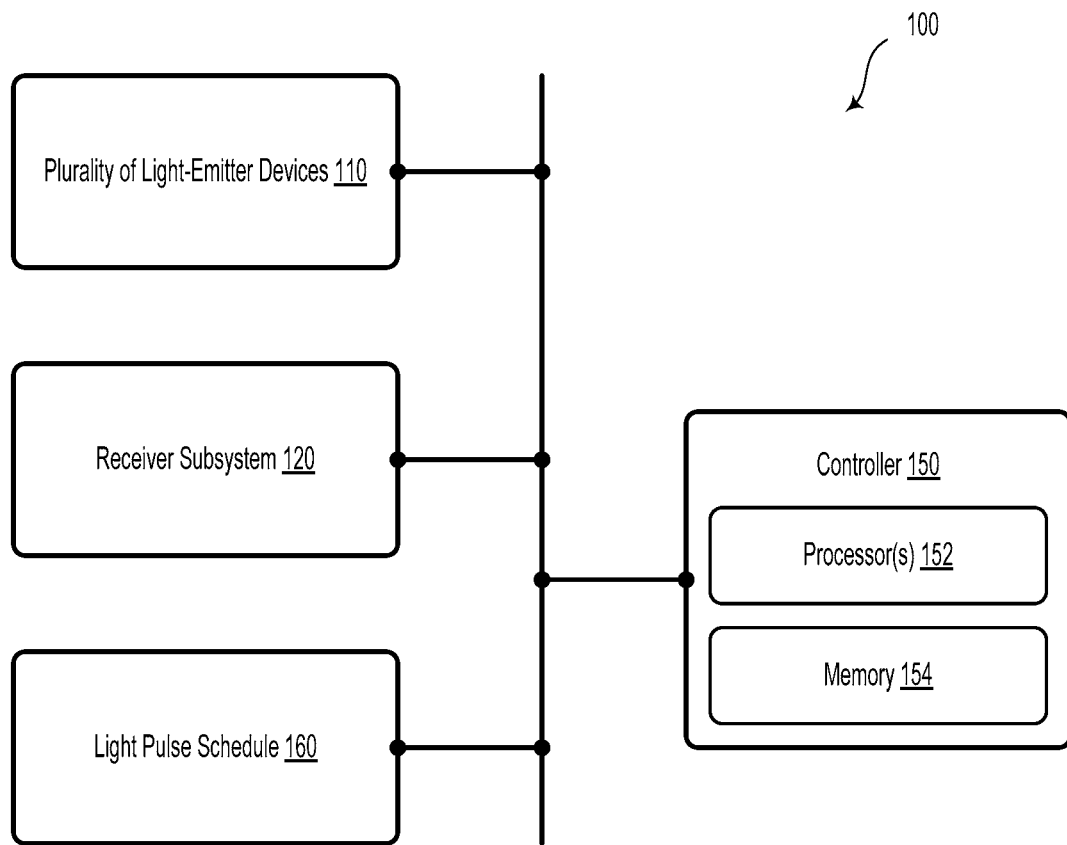
FIG. 1B illustrates a system, according to an example embodiment.

FIG. 1B illustrates a system 100, according to an example embodiment. System 100 may describe at least a portion of a LIDAR system. Furthermore, system 100 may include similar or identical elements as sensing system 10, as illustrated and described in reference to FIG. 1A. In some embodiments, the system 100 may be incorporated as part of a sensing system of an autonomous or semi-autonomous vehicle, such as vehicle 300 as illustrated and described in reference to FIGS. 3 and 4A-4D.

System 100 includes a plurality of light-emitter devices 110, a receiver subsystem 120, and a controller 150. System 100 also includes a light pulse schedule 160.

In some embodiments, the plurality of light-emitter devices 110 can include laser diodes, light-emitting diodes, or other types of light-emitting devices. In an example embodiment, the plurality of light-emitter devices 110 include InGaAs/GaAs laser diodes configured to emit light at a wavelength around 903 nanometers. In some embodiments, the plurality of light-emitting devices 110 comprises at least one of: a laser diode, a laser bar, or a laser stack. Additionally or alternatively, the plurality of light-emitter devices 110 may include one or more master oscillator power amplifier (MOPA) fiber lasers. Such fiber lasers may be configured to provide light pulses at or around 1550 nanometers and may include a seed laser and a length of active optical fiber configured to amplify the seed laser light to higher power levels. However, other types of light-emitting devices, materials, and emission wavelengths are possible and contemplated.

In some embodiments, the plurality of light-emitter devices 110 is configured to emit light into an environment along a plurality of emission vectors toward respective target locations so as to provide a desired resolution. In such scenarios, the plurality of light-emitter devices 110 is operable to emit light along the plurality of emission vectors such that the emitted light interacts with an external environment of the system 100.

In some embodiments, the system 100 may include at least one substrate having a plurality of angled facets along a front edge. In such scenarios, each angled facet may include a respective die attach location. As an example, each light-emitter device could be coupled to a respective die attach location so as to be operable to emit light along its respective emission vector.

In such embodiments, the at least one substrate may be disposed along one or more a vertical planes. In such a scenario, the plurality of emission vectors may be defined with respect to a horizontal plane. Furthermore, as an example, the at least one substrate may be oriented vertically within a housing configured to rotate about a rotational axis, which may itself be substantially vertical. In other words, the plurality of light-emitter devices 110 and the receiver subsystem 120 may be coupled to the housing. In such scenarios, the housing is configured to rotate about a rotational axis.

For example, each light-emitter device could be oriented along the common substrate so as to emit light toward a respective target location along a respective emission vector. It will be understood that many different physical and optical techniques may be used to direct light toward a given target location. All such physical and optical techniques are contemplated herein.

In some embodiments, the desired resolution could include a target resolution at a given distance away from the system 100. For example, the desired resolution may include a vertical resolution of 7.5 centimeters at 25 meters from the system 100 and/or between adjacent target locations along a horizontal ground plane, whichever is closer. Other desired resolutions, both along a two-dimensional surface and within three-dimensional space, are possible and contemplated herein.

In some embodiments, the at least one substrate could be disposed along a vertical plane. In such a scenario, at least two emission vectors of the plurality of emission vectors may vary with respect to a horizontal plane.

In embodiments where the plurality of light-emitter devices 110 are distributed over a plurality of substrates, each portion of the plurality of light-emitter devices 110 could configured to illuminate the environment at a respective pointing angle with respect to the vertical plane. As an example, the plurality of light-emitter devices 110 may include at least 64 light-emitter devices. However, a greater or fewer number of light-emitter devices 110 could be used.

In some embodiments, the plurality of light-emitter devices 110 could be configured to provide light pulses between approximately 1-10 nanoseconds in duration. Other light pulse durations are possible.

In some embodiments, system 100 may include optical elements (not illustrated), which could include respective lenses optically coupled to a respective output facet of the respective light-emitter devices. The respective lenses may include, but are not limited to, fast-axis collimating lenses.

In some embodiments, the receiver subsystem 120 may be similar or identical to receiver block 30, as illustrated and described in reference to FIG. 1A. For example, the receiver subsystem 120 may be configured to provide information indicative of interactions between the emitted light and the external environment. In such a scenario, the receiver subsystem 120 can include a device configured to receive at least a portion of the light emitted from the plurality of light-emitter devices 110 so as to correlate a received light pulse with an object in the environment of system 100.

The receiver subsystem 120 may include a plurality of light-detector devices. In such scenarios, the plurality of light-detector devices could be configured to detect light having a wavelength of at least one of: 1550 nm or 780 nm. Other wavelengths are possible and contemplated herein. In some embodiments, the light-detector devices could include at least one of: an avalanche photodiode, a single photon avalanche detector (SPAD), or a silicon photomultiplier (SiPM). In further embodiments, the light-detector devices may include a plurality of InGaAs photodetectors. Other types of photodetectors are possible and contemplated.

The controller 150 may include an on-board vehicle computer, an external computer, or a mobile computing platform, such as a smartphone, tablet device, personal computer, wearable device, etc. Additionally or alternatively, the controller 150 may include, or be connected to, a remotely-located computer system, such as a cloud server network. In an example embodiment, the controller 150 may be configured to carry out some or all method blocks or steps described herein.

The controller 150 may include one or more processors 152 and at least one memory 154. The processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations described herein.

Additionally or alternatively, the controller 150 could include a circuit (e.g., a synchronous digital circuit) operable to carry out the various operations described herein. For example, the circuit may include a shot table. Other functions of the circuit (e.g., reading and sequencing) may be performed by a synchronous digital logic circuit. In some embodiments, the circuit and its operation may be specified in Verilog or another hardware description language. In such scenarios, the controller 150 need not include a processor.

The operations carried out by the controller 150 may include determining, for at least one light-emitter device of the plurality of light-emitter devices, a light pulse schedule. The light pulse schedule is based on a respective emission vector of the at least one light-emitter device and a three-dimensional map of the external environment. The light pulse schedule includes at least one light pulse parameter and a listening window duration. In some embodiments, the at least one light pulse parameter may include at least one of: a desired pulse onset time, a desired wavelength, a desired pulse power, or a desired pulse duration. Other types of light pulse parameters may be possible and contemplated herein.

In some embodiments, the operation of determining the light pulse schedule may include determining an object and a corresponding object distance. As a non-limiting example, the object may include at least one of: a ground surface, a vehicle, an obstacle, or an occluding element. In some embodiments, the object is located along the respective emission vector of the at least one light-emitter device in the external environment. Furthermore, the operations may include determining the listening window duration based on the corresponding object distance and a speed of the light pulse.

The operations include causing the at least one light-emitter device of the plurality of light-emitter devices to emit a light pulse according to the light pulse schedule.

In some embodiments, the operations may additionally or alternatively include, during the listening window duration, receiving information indicative of an interaction between the light pulse and the external environment. In such scenarios, the operations may include, based on the received information, adjusting the three-dimensional map of the external environment. Yet further, in some embodiments, the operations may also include, based on the received information, adjusting the light pulse schedule. In some embodiments, the listening window duration is adjustable within an inclusive range between 200 nanoseconds and 2 microseconds. However, other listening window durations are possible and contemplated.

Figure 2:
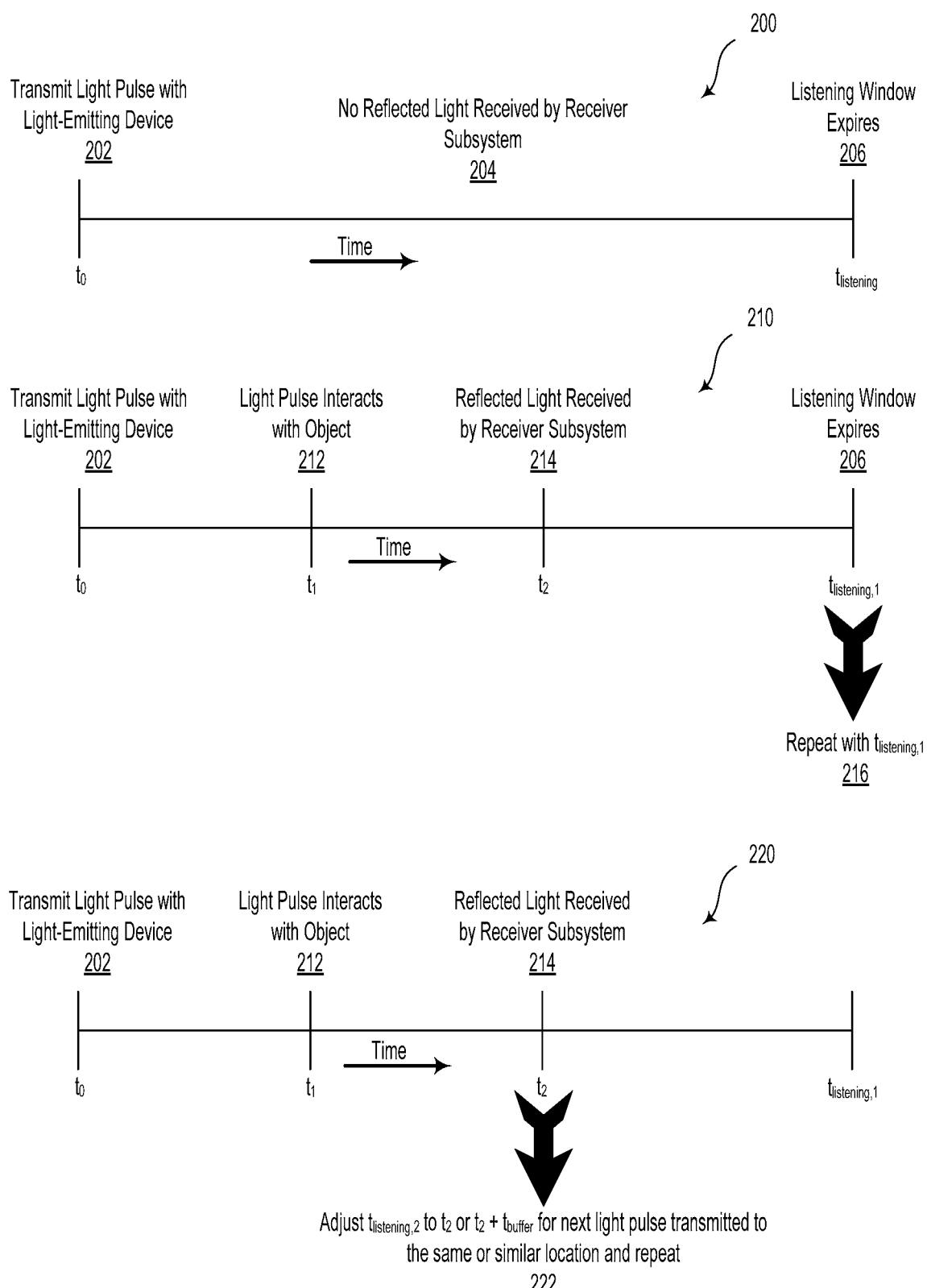
FIG. 2 illustrates several timing sequences, according to example embodiments.

FIG. 2 illustrates several timing sequences 200, 210, and 220, according to example embodiments. The timing sequences 200, 210, and 220 may illustrate blocks of various modes of operation of LIDAR devices, which may include system 100. In an example embodiment, the timing sequences 200, 210, and 220 may describe different ways of handling the timing between light pulses. Specifically, the timing sequences 200, 210, and 220 may describe different scenarios for handling how long a LIDAR system may wait during a predetermined listening window before proceeding with transmitting a next light pulse.

Block 202 of timing sequence 200 includes causing a light-emitter device to transmit a light pulse into an environment (e.g., an environment of the system 100) at $t_0$. The listening window may commence once a light pulse is emitted and may remain "open" until $t_{listening}$. That is, during the listening window between to and $t_{listening}$, the receiver subsystem (e.g., receiver subsystem 120) may be operable to receive a reflected light pulse that has interacted with an object in the environment.

As described in block 204, in some instances, no reflected light, or insufficient reflected light, may be received by the receiver subsystem during the listening window of duration $t_{listening}$. In such a scenario, the listening window may "close" or expire as illustrated in block 206. In such scenarios, the system 100 may determine that no object is present along the emission vector of the light pulse within a predetermined range. In some embodiments, the predetermined range may be based on the maximum roundtrip distance that the light pulse may be able to travel within $t_{listening}$ (e.g., $(t_{listening}/2)$*speed of light).

Turning to timing sequence 210, block 202 may again include causing a light-emitter device to emit a light pulse into an environment at $t_0$. In block 212, the light pulse may interact with an object in the environment at $t_1$. For instance, the light pulse may be reflected from the object and at least a portion of the light from the light pulse may be redirected back toward the receiver subsystem. In block 214, the reflected portion of light may be received by the receiver subsystem (e.g., receiver subsystem 120) at $t_2$, which is prior to $t_{listening,1}$. According to timing sequence 210, block 206 may include the listening window expiring (at time $t_{listening,1}$). Upon expiration of the listening window, block 216 may repeat the timing sequence 210 with subsequent light pulses and listening windows.

Timing sequence 220 may illustrate some of the embodiments described herein. Namely, timing sequence 220 may provide a way to dynamically adjust subsequent listening window durations based on objects in an environment of the system. In such scenarios, block 202 includes causing a light-emitting device to emit a light pulse into the environment at $t_0$. Furthermore, the light pulse may interact with the object in the environment at $t_1$. Yet further, block 214 may include that the reflected light (or at least a portion thereof) is received by the receiver subsystem at $t_2$. In some embodiments, the listening window $t_{listening,1}$ may remain open for the predetermined time. However, in some cases, the listening window need not remain open for the predetermined time and the next light pulse could be emitted immediately after receiving the reflected light.

Additionally or alternatively, upon receiving the reflected light, the system (e.g., system 100) may carry out block 222. Block 222 may include adjusting a subsequent listening window $t_{listening,2}$. In some embodiments, the subsequent listening window may correspond to the immediate next light pulse and/or another future light pulse that is anticipated to interact with the object in the environment. In some embodiments, block 222 may be carried out at $t_{listening,1}$ or at a later time.

In example embodiments, $t_{listening,2}$ could be adjusted to $t_2$. That is, the subsequent listening window could be shortened to match the roundtrip time for the prior light pulse to interact with the object and return to the receiver subsystem.

Additionally or alternatively, the subsequent listening period $t_{listening,2}$ could be adjusted to $t_2 + t_{buffer}$. In such embodiments, $t_{buffer}$ may include a "buffer time" to ensure the subsequent listening window stays open long enough to detect reflected light from the object. In some embodiments, the buffer time may be based on a determined velocity vector of the object. For example, if the object is determined to be moving away from the light source, the buffer time $t_{buffer}$ may greater than that of a scenario in which the light source to object distance is constant. Furthermore, $t_{buffer}$ may be a predetermined amount of time that could correspond to a maximum velocity vector of the object. For example, the predetermined amount of buffer time could be based on a maximum distance the object could be at when a subsequent light pulse interacts with the object. It will be understood that $t_{buffer}$ may be based on other considerations as well, all of which are contemplated herein.

The timing diagram 220 relates to setting a predetermined listening period based on an object determined in an environment of the system. It will be understood that such a timing diagram 220 may be repeated in serial and/or parallel fashion for each light-emitter device and/or each light pulse emitted by the system. As such, a light pulse schedule (e.g., light pulse schedule 160) may be built up and/or adjusted based on objects that are detected in the environment. Namely, listening periods may be reduced or minimized so as to reduce the time spent waiting for a listening period to expire even though a reflected light pulse had already been detected. By utilizing dynamic listening periods, more light pulses could be emitted (and reflected light pulses received), which could provide higher spatial and/or temporal sensing resolution and/or a larger field of view sensing within a given amount of time.

Figure 3:
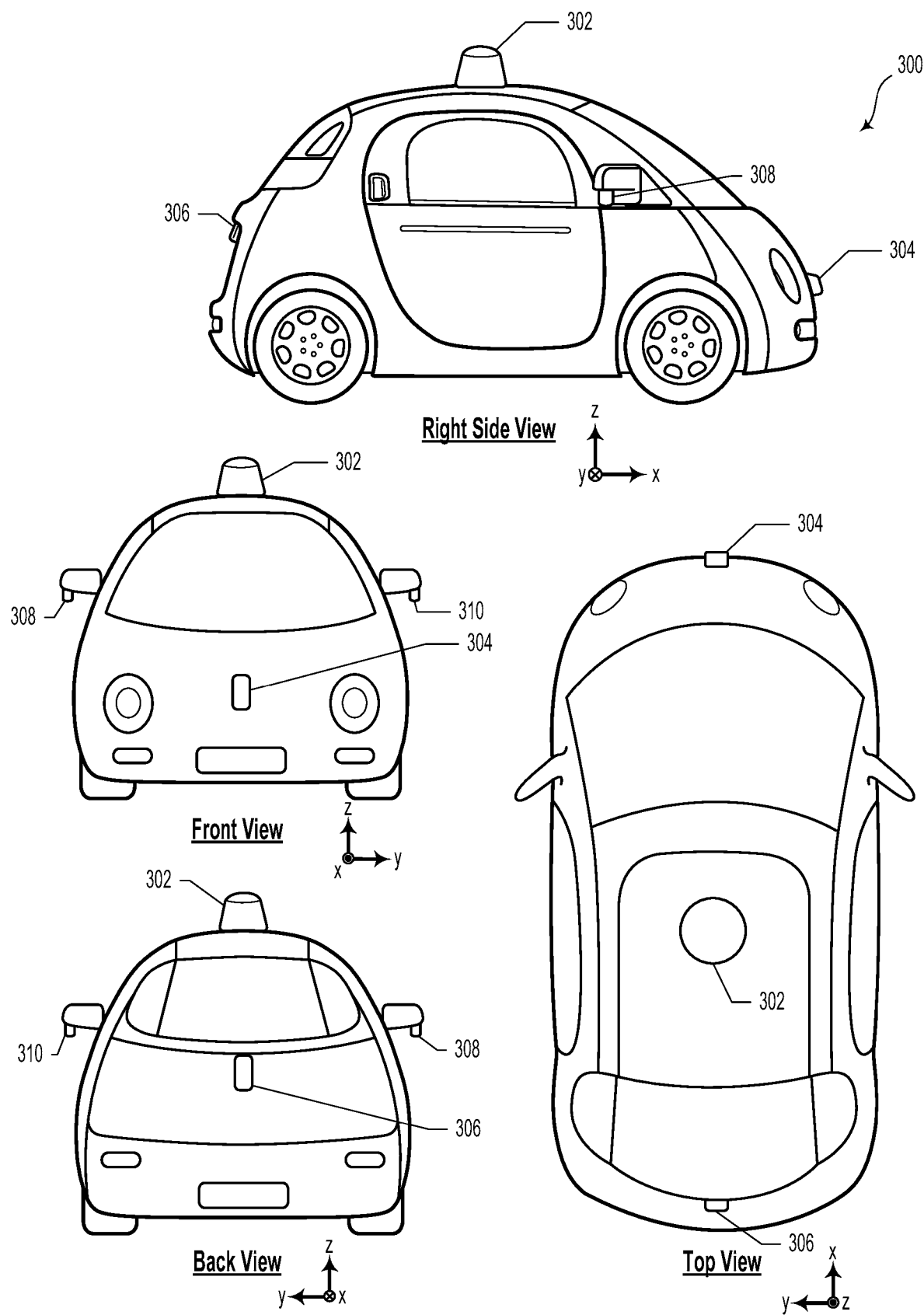
FIG. 3 illustrates a vehicle, according to an example embodiment.

FIG. 3 illustrates a vehicle 300, according to an example embodiment. The vehicle 300 may include one or more sensor systems 302, 304, 306, 308, and 310. The one or more sensor systems 302, 304, 306, 308, and 310 could be similar or identical to sensor system 10. As an example, sensor systems 302, 304, 306, 308, and 310 may include transmit block 20, as illustrated and described with reference to FIG. 1A. Namely, sensor systems 302, 304, 306, 308, and 310 could include LIDAR sensors having a plurality of light-emitter devices arranged over a range of angles with respect to a given plane (e.g., the x-y plane).

One or more of the sensor systems 302, 304, 306, 308, and 310 may be configured to rotate about an axis (e.g., the z-axis) perpendicular to the given plane so as to illuminate an environment around the vehicle 300 with light pulses. Based on detecting various aspects of reflected light pulses (e.g., the elapsed time of flight, polarization, etc.), information about the environment may be determined.

In an example embodiment, sensor systems 302, 304, 306, 308, and 310 may be configured to provide respective point cloud information that may relate to physical objects within the environment of the vehicle 300. While systems 10 and 100, vehicle 300 and sensor systems 302 and 304 are illustrated as including certain features, it will be understood that other types of systems are contemplated within the scope of the present disclosure.

As an example, an example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle.

While certain description and illustrations herein describe systems with multiple light-emitter devices, LIDAR systems with fewer light-emitter devices (e.g., a single light-emitter device) are also contemplated herein. For example, light pulses emitted by a laser diode may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

Furthermore, the shot schedule could be adjusted to reduce the wait time until a subsequent shot for a light pulse that is directed downwards. That is, due to a shorter distance traveled, the listening window may not be as long in duration as that for light pulses that travel farther within a given environment.

Figure 4A:
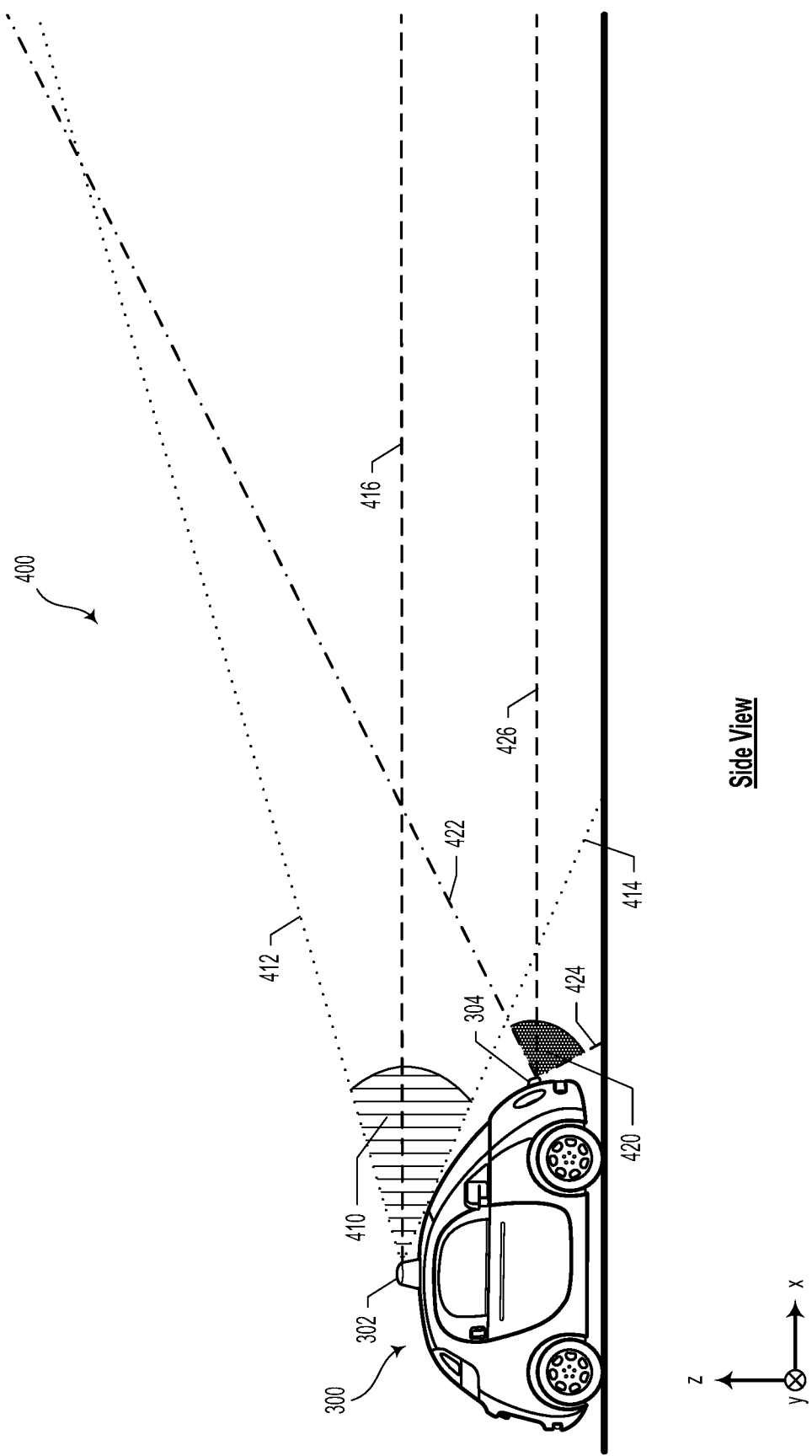
FIG. 4A illustrates a sensing scenario, according to an example embodiment.

FIG. 4A illustrates a side view of vehicle 300 in a sensing scenario 400, according to an example embodiment. In such a scenario, sensor system 302 may be configured to emit light pulses into an environment of the vehicle 300 over an elevation angle range 410 between a maximum elevation angle 412 and a minimum elevation angle 414. In some embodiments, sensor system 302 may include a plurality of light-emitter devices that are arranged in a non-linear elevation angle distribution. That is, to achieve a desired vertical beam resolution, the plurality of light-emitter devices of sensor system 302 may be arranged over beam elevation angles that include heterogeneous elevation angle differences between adjacent beams.

As a further example, sensor system 304 may be configured to emit light pulses into an environment of the vehicle 300 over an elevation angle range 420, which may be defined between a maximum elevation angle 422 and a minimum elevation angle 424. In some embodiments, a plurality of light-emitter devices of sensor system 304 may illuminate the environment about the vehicle 300 with a non-linear elevation angle distribution. That is, to achieve a desired vertical beam resolution, the plurality of light-emitter devices of sensor system 304 may be arranged over a set of beam elevation angles that include heterogeneous differences in elevation angle between adjacent beams.

As illustrated in FIG. 4A, a first light pulse path 416 extending from sensor system 302 may be unobstructed by an object. In such scenarios, a light pulse emitted by sensor system 302 along the first light pulse path 416 may propagate without interacting with an object in the environment. That is, the light pulse will not be reflected back toward the sensor system 302. Determining that the first light pulse path 416 is unobstructed could be determined based on a prior light pulse emitted along the same light pulse path or along a substantially similar path, or based on a two-dimensional or three-dimensional map of the environment around the sensor system 302.

In scenarios where the first light pulse path 416 is determined to be unobstructed, or is anticipated to be unobstructed, a predetermined listening period associated with a given light pulse could be set to a maximum listening period duration (e.g., 2 microseconds). Other listening period durations are possible and contemplated. In some embodiments, setting the listening period to a maximum duration may provide sensing of objects when they become closer than a predetermined maximum sensing distance.

As illustrated in FIG. 4A, second light pulse path 426 extending from sensor system 304 may also be unobstructed by an object. As such, under methods and systems described herein, a light pulse emitted by sensor system 304 along the second light pulse path 426 may propagate without interacting with an object in the environment. That is, the light pulse will not be reflected back toward the sensor system 304. Determining that the second light pulse path 426 is unobstructed could be determined based on a prior light pulse emitted along the same light pulse path or along a substantially similar path, or based on a two-dimensional or three-dimensional map of the environment around the sensor system 304.

In scenarios where the second light pulse path 426 is determined to be unobstructed, or is anticipated to be unobstructed, a predetermined listening period associated with a given light pulse emitted along the second light pulse path 426 could be set to a maximum listening period duration (e.g., 2 microseconds). Other listening period durations are possible and contemplated.

Figure 4B:
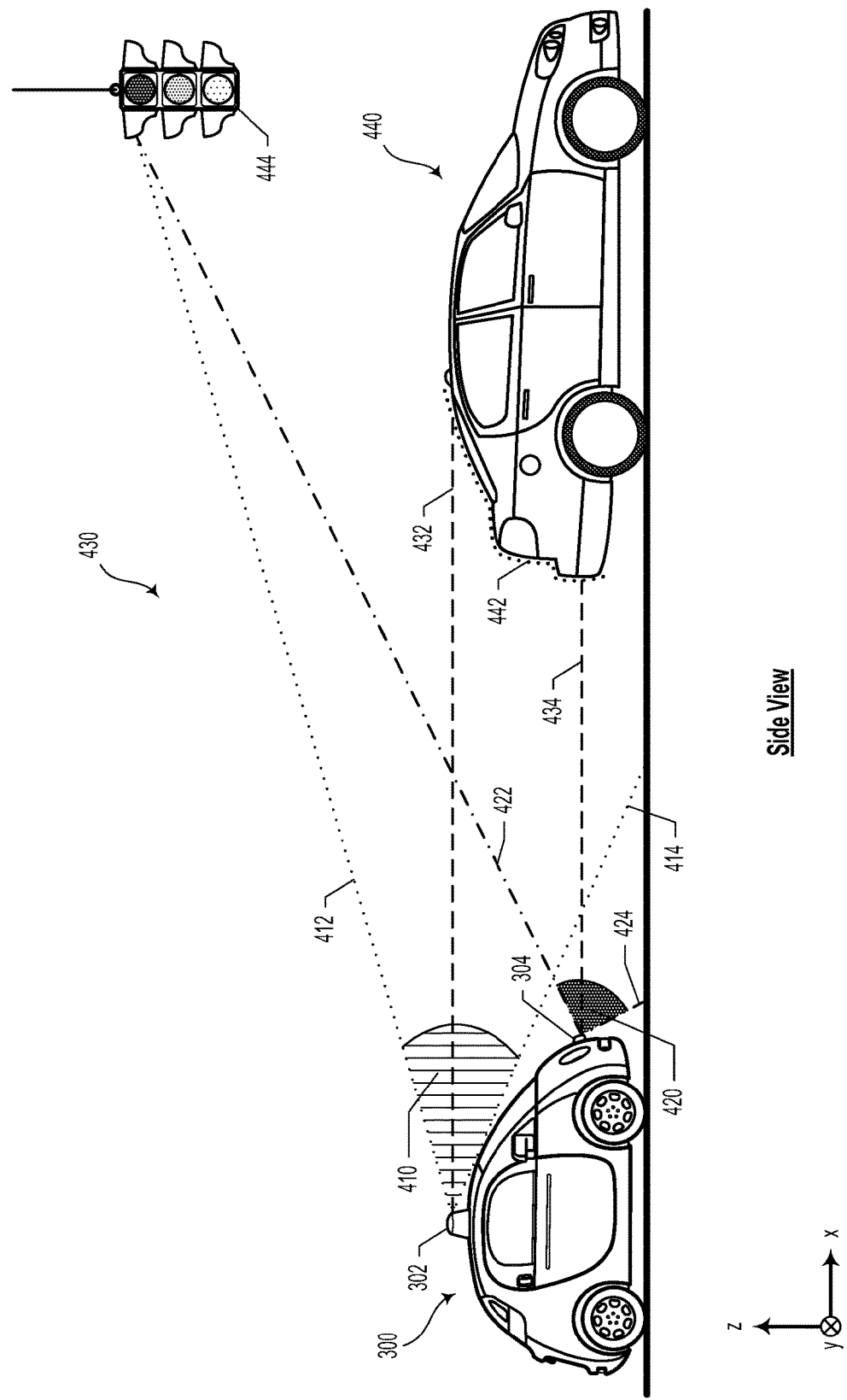
FIG. 4B illustrates a sensing scenario, according to an example embodiment.

FIG. 4B illustrates a sensing scenario 430, according to an example embodiment. At least some elements of sensing scenario 430 could be similar or identical to sensing scenario 400. For example, sensor system 302 may be configured to emit light pulses into an environment of the vehicle 300 over an elevation angle range 410 between a maximum elevation angle 412 and a minimum elevation angle 414. Furthermore, sensor system 304 may be configured to emit light pulses into an environment of the vehicle 300 over an elevation angle range 420, which may be defined between a maximum elevation angle 422 and a minimum elevation angle 424.

As illustrated in FIG. 4B, a first light pulse path 432 extending from sensor system 302 may intersect with an object, such as another vehicle 440. That is, a light pulse emitted by sensor system 302 may interact with a surface 442 of the other vehicle 440. As illustrated, the surface 442 may include a rear portion of the vehicle 440. However, it will be understood that many other types of objects are possible and contemplated herein. Without limitation, such other types of objects may include roadway surfaces, obstacles, foliage, buildings, pedestrians, bicyclists, other vehicles, etc.

Additionally, a second light pulse path 434 extending from sensor system 304 may also intersect with the object (e.g., at a rear bumper portion of the other vehicle 440).

In sensing scenario 430, at least some light of the emitted light pulses may be reflected by the surface 442 as reflected light. When the reflected light is received by sensor systems 302 or 304, a round trip time may be provided. Based at least on the determined round trip time, a relative distance between the sensor systems 302 and 304 and the other vehicle 440 could be estimated or otherwise determined.

As such, under methods and systems described herein, a light pulse emitted (by sensor system 302 along the first light pulse path 432 or by sensor system 304 along the second light pulse path 434) may have an associated listening period that could be based on the estimated or anticipated distance to the object. As an example, the listening period duration could be set to an amount of time equal to the anticipated round trip time (e.g., 200 nanoseconds) to the surface 442 and back. Other listening period durations are possible and contemplated.

As described elsewhere herein, the estimated or anticipated distance to the object could be based on a LIDAR point cloud, or a three-dimensional (e.g., a depth map) or two-dimensional map. Furthermore, the associated listening period set for light pulses emitted toward anticipated objects could be based on the anticipated distance to the target or the anticipated distance to the target plus a buffer time so as to account for possible relative movement between the sensor systems 302 and 304 and the vehicle.

Figure 4C:
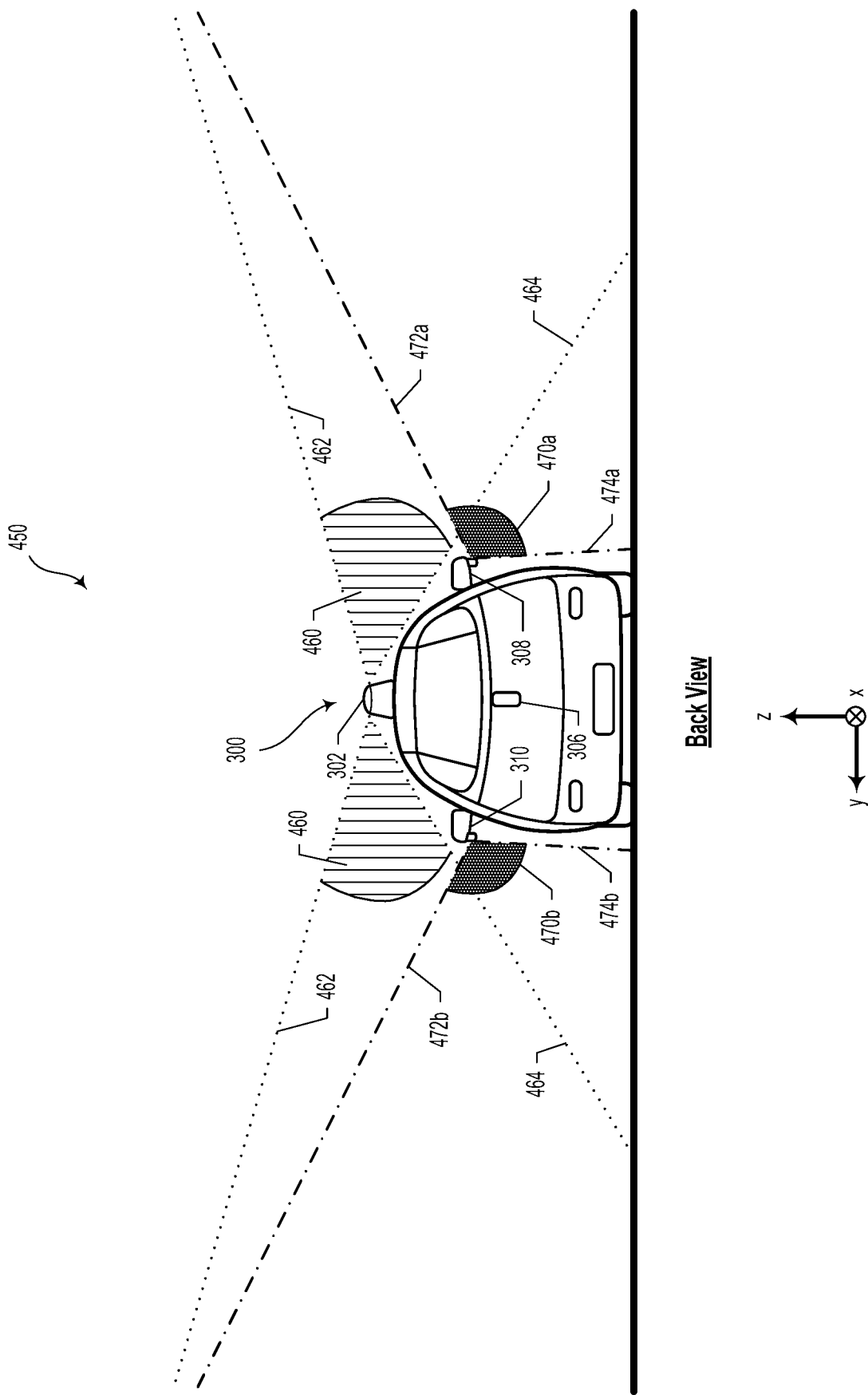
FIG. 4C illustrates a sensing scenario, according to an example embodiment.
Figure 4D:
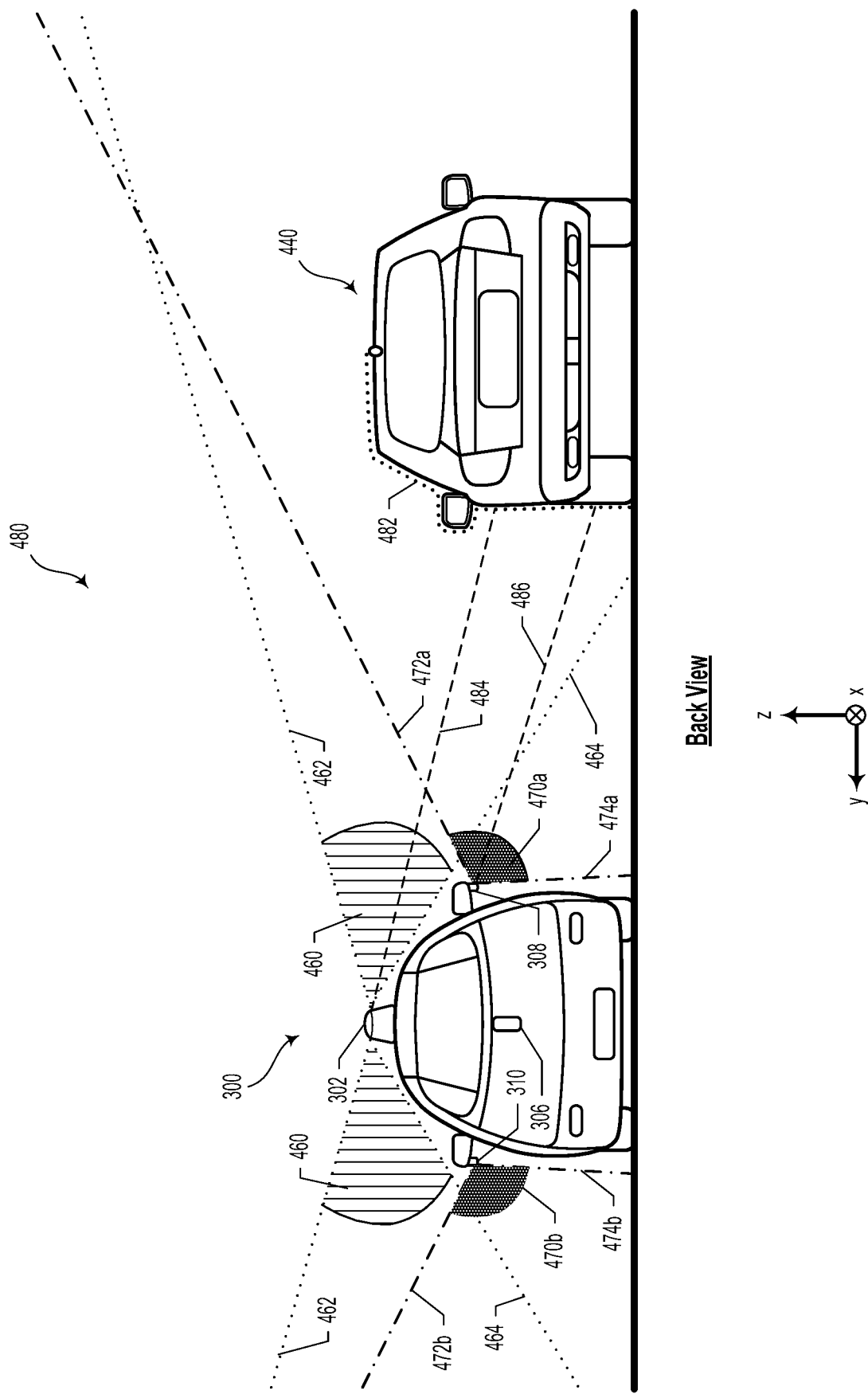
FIG. 4D illustrates a sensing scenario, according to an example embodiment.

FIGS. 4C and 4D illustrate further sensing scenarios that include vehicle 300. FIG. 4C illustrates a back view of vehicle 300 in a sensing scenario 450. As illustrated in sensing scenario 450, the sensor systems 302, 308 and 310 may be unobstructed, apart from a ground surface. For example, sensor system 302 could be configured to detect objects over an elevation angle range 460 having a maximum elevation angle 462 and a minimum elevation angle 464. Similarly, sensor systems 308 and 310 may provide respective elevation angle ranges 470a and 470b, which may be bounded by respective maximum elevation angles 472a and 472b and respective minimum elevation angles 474a and 474b.

Sensing scenario 450 may include respective light pulse schedules (e.g., light pulse schedule 160) for each of the sensor systems 302, 308 and 310. Furthermore, each of the light pulse schedules may include predetermined listening periods based on either a maximum sensing distance or an anticipated ground location.

FIG. 4D illustrates a sensing scenario 480, according to an example embodiment. Sensing scenario 480 may include a vehicle 440, which may be in an adjacent lane of a multi-lane road. As such, light pulses emitted from sensor system 302 at some elevation angles, such as elevation angle 484 may interact with a surface 482 of the vehicle 440. Furthermore, light pulses emitted from sensor system 308 at various elevation angles, such as elevation angle 486, may interact with the surface 484. In such embodiments, a round trip time of the reflected light pulse will be less than the round trip time of the reflected light pulse from a ground surface. As such, in scenarios such as sensing scenario 480 where an object surface (e.g., surface 482) is determined to, or is anticipated to exist, a light pulse schedule may be adjusted based on a shortened listening period for the respective reflected light pulses. It will be understood that sensing scenario 480 could include many other different types of objects and positions of such objects.

Example embodiments may include adjusting various aspects of an emitted light pulse and/or a listening window duration based on a changing environment around the vehicle as it moves around the world. Specifically, aspects of the emitted light pulses and their associated listening window durations may be varied based on, without limitation, an undulating roadway (e.g., grade changes when driving uphill or downhill, driving around a curve, etc.), objects on or adjacent to the roadway (e.g., pedestrians, other vehicles, buildings, etc.), or other static or dynamically-varying environmental conditions or contexts.

Figure 4E:
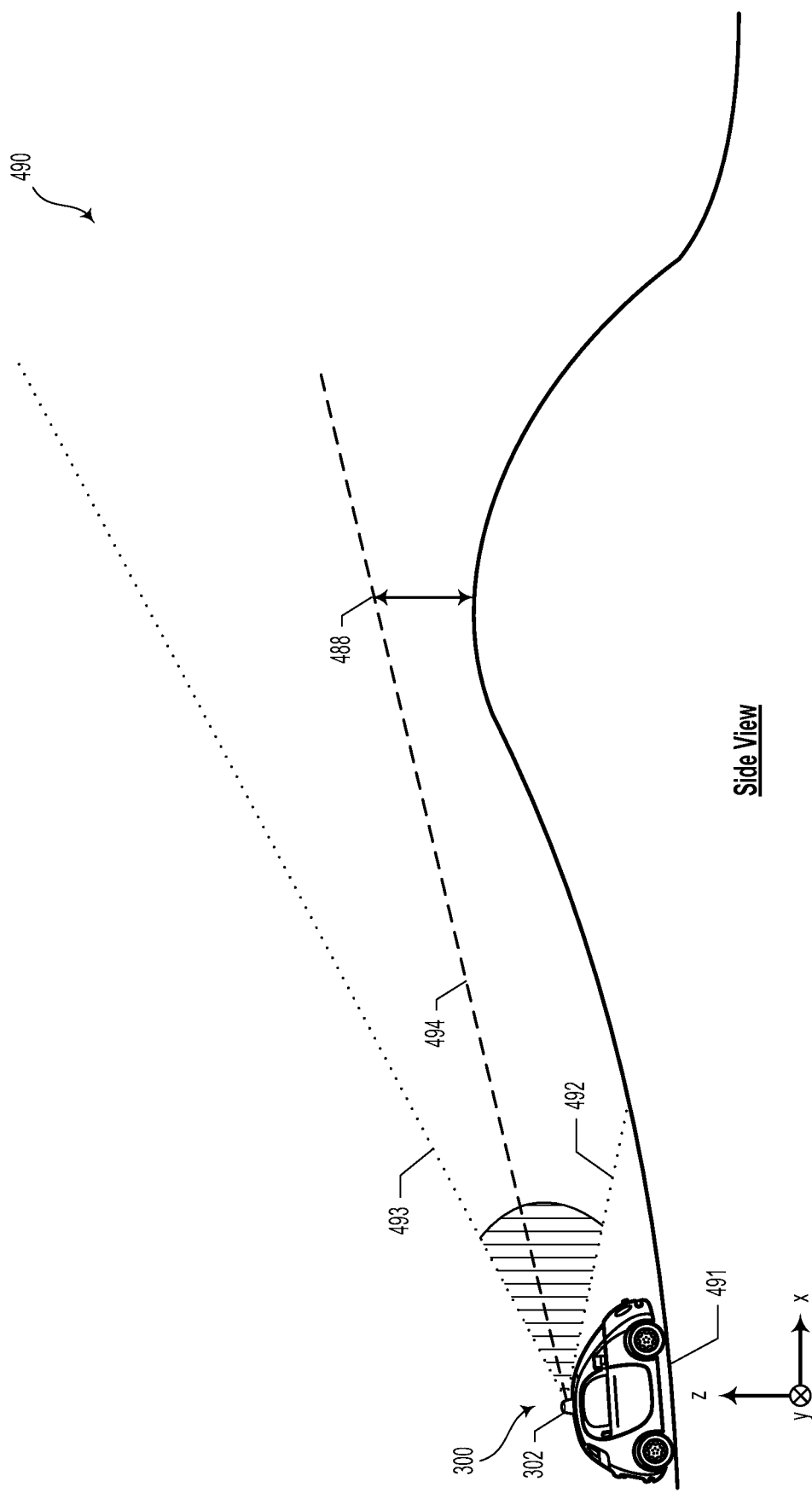
FIG. 4E illustrates a sensing scenario, according to an example embodiment.

FIG. 4E illustrates a sensing scenario 490, according to an example embodiment. Vehicle 300 may be in contact with an uphill roadway surface 491. In such a scenario, objects we may be interested in sensing may include other vehicles in contact with the same roadway surface 491 (e.g., oncoming traffic over the hill). Such objects and/or other vehicles, which may interfere with a vehicle path of travel, could be between 0 to 4 meters above the roadway surface 491. As such, while sensor 302 may be operable to sense objects between a minimum beam elevation angle 492 to a maximum beam elevation angle 493, in some embodiments, data obtained between the minimum beam elevation angle 492 and a dynamically-changing "ground-skimming" beam elevation angle 494 may be designated as being more important or as having a higher priority in an effort to detect other vehicles and objects along the undulating roadway surface 491. The "ground-skimming" beam elevation angle 494 could be dynamically defined as a scanning angle that corresponds to a specific location 488, which may be at a predetermined height above the roadway and a predetermined distance away from the vehicle 300. In an example embodiment, the specific location 488 could be approximately 4 meters above the ground at about 60 meters from the vehicle 300.

Accordingly, in some embodiments and under some conditions, systems and methods described herein need not always scan the entire range of possible beam elevation angles (e.g., angles between an entire angle range between minimum beam elevation angle 492 and the maximum beam elevation angle 493). Instead, the beam-scanning range may be varied based on the dynamically-changing yaw-dependent contours of the roadway and/or other portions of the environment around the vehicle 300.

Referring to FIG. 4E, in some embodiments, the beam elevation angles between the "ground-skimming" beam elevation angle 494 and the maximum beam elevation angle 493 need not be scanned at all. That is, for a given yaw angle, light pulses need not be emitted into elevation ranges that are predicted to not include objects that might interfere with progress of the vehicle 300. Additionally or alternatively, the light pulses could be emitted into those angle ranges, but the corresponding listening windows could be shortened or eliminated altogether.

In some embodiments, the listening window durations may be adjusted within a range of predetermined listening window durations. In such a scenario, the range of predetermined listening window durations could include a maximum listening window duration, which could correspond to a maximum detection range, and a minimum listening window duration, which could correspond to a minimum detection range. By way of example, the maximum detection range could be approximately 200 meters or more. In some embodiments, the minimum detection range could be approximately 5 meters or less. Correspondingly, to detect a round-trip light pulse, the maximum and minimum listening window durations could be 1.3 microseconds and 33 nanoseconds, respectively. Other maximum and minimum listening window durations are possible and contemplated.

Furthermore, for the light pulses that are emitted into the angles between the minimum beam elevation angle 492 and the "ground-skimming" beam elevation angle 494, the corresponding listening windows may be lengthened (or maximized) in an effort to increase the likelihood that objects on or close to the ground will be detected.

In some embodiments, systems and methods described herein may adjust listening windows and/or aspects of light pulse emission based on a contour line that extends around the vehicle (e.g., through 360 degrees or a plurality of yaw angles) and may be defined as a continuous line that is located at a predetermined distance away from the vehicle 300 (e.g., 60, 100, or 200 meters away) and/or at a predetermined height above a ground surface. Such a contour line may be dynamically adjusted as the vehicle 300 moves around its environment. The contour line could be determined based on a topographic map or current or prior point cloud information obtained by the vehicle 300 and/or other vehicles. In some embodiments, the contour line could pass through various points described in FIGS. 4A-4F. For example, the contour line could pass through specific locations 488 and 489.

In other words, consider a scenario where the contour line represents a predetermined height of one meter from the ground at 60 meters distance from the vehicle 300. When the vehicle 300 is on level terrain with no objects at one meter from the ground, the contour line could be represented by a two-dimensional circle with 60 meter radius that is centered on the vehicle. However, when the vehicle 300 encounters hilly terrain and/or objects at one meter from the ground, the contour line could include a three-dimensional circle, oval, or irregular shape based on topographical features and/or object data. In some embodiments, the listening window durations could be adjusted based on a shape of the contour line.

FIG. 4F illustrates a sensing scenario 495, according to an example embodiment. Vehicle 300 may be in contact with a downhill roadway surface 499. As described above with reference to FIG. 4E, some beam angles of sensor 302 may be "prioritized" over others. For example, a "ground-skimming" beam elevation angle 498 may dynamically change based on a specific location 489 (which may be defined for each yaw angle) that corresponds to a predetermined distance away from the vehicle 300 and a predetermined height about a ground surface. A range of beam angle elevations between the "ground-skimming" beam elevation angle 498 and minimum beam elevation angle 496 may be prioritized over other beam elevations (e.g., beam elevation angles between the "ground-skimming" beam elevation angle 498 and the maximum beam elevation angle 497).

As described above, in some embodiments, light pulses need not be emitted into beam elevation angles above the "ground-skimming" beam elevation angle 498. Additionally or alternatively, listening window durations for light pulses emitted into such an elevation angle range may be reduced or eliminated altogether. Other distinctions between transmission and reception of light pulses into yaw-dependent beam angles ranges are possible based on a topographic map, point cloud information, or other knowledge about objects and/or ground surfaces within an environment of the vehicle 300. In some embodiments, the point cloud information may be gathered by a vehicle utilizing the LIDAR system (from a previous scan earlier in the drive and/or from a scan from a prior drive of the vehicle along the same route) or another vehicle utilizing a LIDAR system. The other vehicle could be part of a common fleet of vehicles or be associated with a different fleet.

Figure 5:
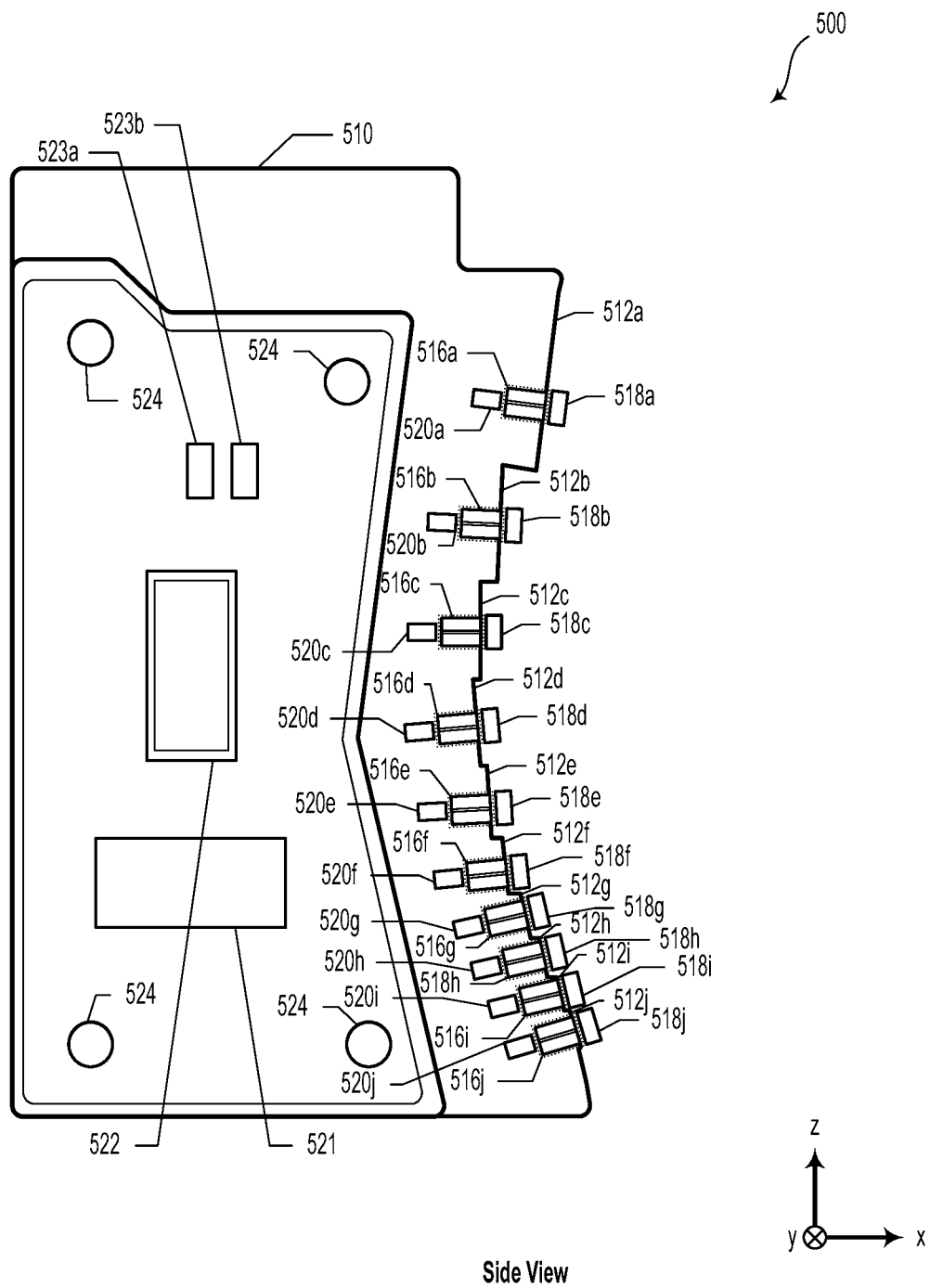
FIG. 5 illustrates a system with light-emitter devices, according to an example embodiment.

FIG. 5 illustrates a system 500 having a plurality of light-emitter devices 516*a*-516*j*, according to an example embodiment. System 500 may include a portion of a LIDAR transmit block that includes a substrate 510. Substrate 510 may be formed from a printed circuit board material. In some embodiments, the substrate 510 may be formed by laser cutting and precision drilling operations. The substrate 510 may include a wire bondable finish, such as Electroless Nickel-Electroless Palladium-Immersion Gold (ENEPIG). The at least one substrate 510 could include a plurality of angled facets 512*a*-512*j* along a front edge and a die attach location (not shown) corresponding to each angled facet 512*a*-512*j*. In such a scenario, the plurality of angled facets 512*a*-512*j* provides a corresponding plurality of elevation angles. In an example embodiment, a set of angle differences between adjacent elevation angles may include at least two different angle difference values. That is, the elevation angles do not include a uniform angle difference, but rather the angle differences may differ from one another based on, for example, the respective elevation angles and whether the elevation angles are oriented below or above a horizontal plane. Generally, elevation angles oriented below the horizontal may be more widely spaced for at least the reason that the photons are unlikely to travel as far as those at higher elevation angles.

The plurality of light-emitter devices 516*a*-516*j* could be attached to respective die attach locations. As such, each light-emitter device could be oriented so as to emit light pulses along a different elevation angle. Furthermore, each respective light-emitter device of the plurality of light-emitter devices 516*a*-516*j* could be attached to a respective plurality of pulser circuits 520*a*-520*j*. In some example embodiments, the respective pulser circuits could cause the light-emitter devices 516*a*-516*j* to emit light pulses as described herein. Furthermore, the plurality of pulser circuits 520*a*-520*j* could be controlled at least in part, based on a light pulse schedule (e.g., light pulse schedule 160) as described herein.

The light pulse schedule could be adjusted dynamically based on an object being sensed, or anticipated to be, along a given respective elevation angle (or emission vector). In some embodiments, if a given light pulse is anticipated or interact with an object in the environment, a corresponding listening window may be set or adjusted based, at least in part, on a known or anticipated distance to that object.

Furthermore, other optical elements may be included in system 500. For example, a respective plurality of lenses 518*a*-518*j* could be optically coupled to the respective plurality of light-emitter devices 516*a*-516*j*. Yet further, other elements, such as alignment features 524, communication interface 522, socket 521, and other electronic components 523*a* and 523*b* may be included in system 500.

III. Example Methods

Figure 6:
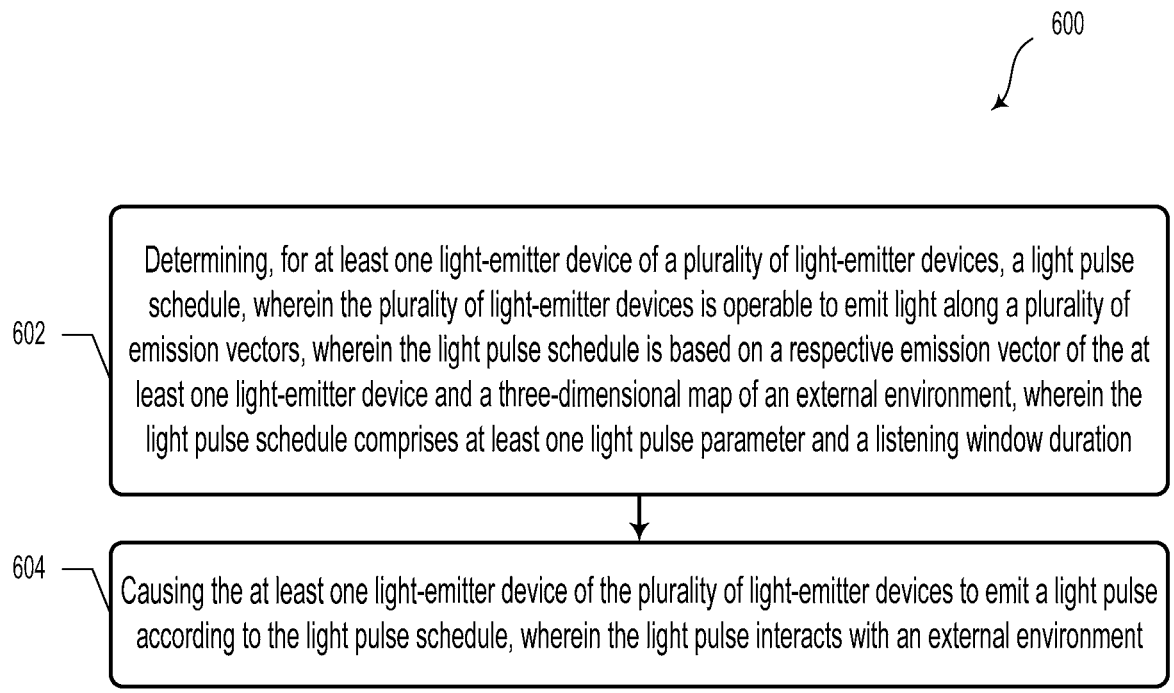
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150 as illustrated and described in relation to FIG. 1B. Furthermore, method 600 may be illustrated, at least in part, by the timing diagram 220, as described in relation to FIG. 2. Yet further, method 600 may be carried out, at least in part, by vehicle 300 as illustrated and described in relation to FIG. 3. Method 600 may be carried out in scenarios similar or identical to scenarios 400, 430, 450, and 480 as illustrated and described in relation to FIGS. 4A-4D.

Block 602 includes determining, for at least one light-emitter device of a plurality of light-emitter devices, a light pulse schedule. In such a scenario, the plurality of light-emitter devices is operable to emit light along a plurality of emission vectors. The light pulse schedule is based on a respective emission vector of the at least one light-emitter device and a three-dimensional map of an external environment. The light pulse schedule includes at least one light pulse parameter and a listening window duration.

In some embodiments, determining the light pulse schedule may include determining an object and a corresponding object distance. In such scenarios, the object is located along the respective emission vector of the at least one light-emitter device in the external environment. The method 600 may also include determining the listening window duration based on the corresponding object distance and a speed of the light pulse.

In some embodiments, the object could include at least one of: a ground surface, a vehicle, an obstacle, or an occluding element.

Furthermore, in some cases, determining the light pulse schedule can include adjusting the listening window duration within an inclusive range between about 200 nanoseconds and about 2 microseconds. Other listening window durations are possible and contemplated.

Block 604 includes causing the at least one light-emitter device of the plurality of light-emitter devices to emit a light pulse according to the light pulse schedule. The light pulse interacts with an external environment.

In some embodiments, method 600 includes causing a housing to rotate about a rotational axis. In such scenarios, the plurality of light-emitter devices is coupled to the housing. As described elsewhere herein, the light-emitter devices could be rotated about a rotational axis similar to that of sensor 302, as illustrated and described in relation to FIG. 3.

Additionally, method 600 may include, during the listening window duration, receiving information indicative of an interaction between the light pulse and the external environment. In such scenarios, method 600 may also include, based on the received information, adjusting the three-dimensional map of the external environment. Additionally or alternatively, method 600 may include, based on the received information, adjusting the light pulse schedule.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a plurality of light-emitter devices, wherein the plurality of light-emitter devices is operable to emit light along a plurality of emission vectors such that the emitted light interacts with an external environment of the system;
a receiver subsystem configured to provide information indicative of interactions between the emitted light and the external environment; and
a controller operable to carry out operations, the operations comprising:
determining, for at least one light-emitter device of the plurality of light-emitter devices, a light pulse schedule, wherein the light pulse schedule is based on a respective emission vector of the at least one light-emitter device and a three-dimensional map of the external environment, wherein the three-dimensional map is a topographical map, and wherein the light pulse schedule comprises at least one pulse parameter and a listening window duration;
adjusting the light pulse schedule based on a contour line that extends around the system, wherein the contour line is determined based on the topographic map; and
causing the at least one light-emitter device of the plurality of light-emitter devices to emit a light pulse according to the adjusted light pulse schedule.

2. The system of claim 1, wherein the contour line comprises a three-dimensional circle, a three-dimensional oval, or a three-dimensional irregular shape.

3. The system of claim 1, wherein the contour line is further determined based on object data from the external environment.

4. The system of claim 1, wherein the contour line extends around the system through a plurality of yaw angles.

5. The system of claim 4, wherein the plurality of yaw angles comprises 360 degrees.

6. The system of claim 1, wherein the contour line comprises a continuous line that extends around the system at a predetermined distance.

7. The system of claim 1, wherein the contour line comprises a continuous line that is located at a predetermined height above a ground surface.

8. The system of claim 1, wherein the operations further comprise dynamically adjusting the contour line as the system moves about the external environment.

9. The system of claim 1, wherein the contour line is further determined based on point cloud information obtained by the system.

10. A method comprising:
determining, for at least one light-emitter device of a plurality of light-emitter devices, a light pulse schedule, wherein the plurality of light-emitter devices is operable to emit light along a plurality of emission vectors, wherein the light pulse schedule is based on a respective emission vector of the at least one light-emitter device and a three-dimensional map of an external environment, wherein the three-dimensional map is a topographical map, and wherein the light pulse schedule comprises at least one light pulse parameter and a listening window duration;
adjusting the light pulse schedule based on a contour line that extends around a vehicle, and wherein the contour line is determined based on the topographic map; and
causing the at least one light-emitter device of the plurality of light-emitter devices to emit a light pulse according to the adjusted light pulse schedule, wherein the light pulse interacts with the external environment.

11. The method of claim 10, wherein the contour line comprises a three-dimensional circle, a three-dimensional oval, or a three-dimensional irregular shape.

12. The method of claim 10, wherein the contour line is further based on object data from the external environment.

13. The method of claim 10, wherein the contour line extends around the vehicle through a plurality of yaw angles.

14. The method of claim 13, wherein the plurality of yaw angles comprises 360 degrees.

15. The method of claim 10, wherein the contour line comprises a continuous line that extends around the vehicle at a predetermined distance.

16. The method of claim 10, wherein the contour line comprises a continuous line that is located at a predetermined height above a ground surface.

17. The method of claim 10, further comprising dynamically adjusting the contour line as the vehicle moves about the external environment.

18. The method of claim 10, wherein the contour line is further determined based on point cloud information obtained by the vehicle.

19. A system comprising:
a plurality of light-emitter devices, wherein the plurality of light-emitter devices is operable to emit light along a plurality of emission vectors such that the emitted light interacts with an external environment of the system;
a receiver subsystem configured to provide information indicative of interactions between the emitted light and the external environment; and
a controller operable to carry out operations, the operations comprising:
  determining, for at least one light-emitter device of the plurality of light-emitter devices, a light pulse schedule, wherein the light pulse schedule is based on a respective emission vector of the at least one light emitter device and a three-dimensional map of the external environment, wherein the three-dimensional map is a topographical map, and wherein the light pulse schedule comprises at least one light pulse parameter and a listening window duration;
  adjusting the light pulse schedule based on a contour line that extends around the system, wherein the contour line is determined based on the topographic map; and
  causing the at least one light-emitter device of the plurality of light-emitter devices to emit a first light pulse according to the adjusted light pulse schedule and a second light pulse according to a default light pulse schedule.

20. The system of claim 19, wherein the contour line is further determined based on object data from the external environment.

* * * * *